US011918916B2

(12) United States Patent
Payzer et al.

(10) Patent No.: US 11,918,916 B2
(45) Date of Patent: Mar. 5, 2024

(54) SYSTEMS AND METHODS FOR RICH PERSONALIZATION OF COMPUTER GAME EXPERIENCES

(71) Applicant: Microsoft Technology Licensing, LLC, Redmond, WA (US)

(72) Inventors: Gershom Payzer, Redmond, WA (US); Bridgette Marie Kuehn, Bellevue, WA (US); Christopher Ian Charla, Seattle, WA (US); Kathryn Stone Perez, Kirkland, WA (US); Madeline Jaye Whisenant, Seattle, WA (US); Lily Wang, Lisbon (PT); Jennifer Rose Guriel, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/828,926

(22) Filed: May 31, 2022

(65) Prior Publication Data

US 2023/0381663 A1    Nov. 30, 2023

(51) Int. Cl.
*A63F 13/67* (2014.01)
*A63F 13/537* (2014.01)

(52) U.S. Cl.
CPC ............ *A63F 13/67* (2014.09); *A63F 13/537* (2014.09)

(58) Field of Classification Search
CPC ... A63F 13/67; A63F 2300/535; A63F 13/537
See application file for complete search history.

(56) References Cited

U.S. PATENT DOCUMENTS

| | | | |
|---|---|---|---|
| 2007/0219000 A1* | 9/2007 | Aida | G07F 17/32 463/42 |
| 2008/0261699 A1 | 10/2008 | Topham et al. | |
| 2009/0239660 A1 | 9/2009 | Acres | |
| 2010/0004053 A1* | 1/2010 | Acres | G07F 17/3274 463/25 |

(Continued)

FOREIGN PATENT DOCUMENTS

CN    108764950 A    11/2018

OTHER PUBLICATIONS

"International Search Report and Written Opinion Issued in PCT Application No. PCT/US23/020095", dated Sep. 6, 2023, 19 Pages.

(Continued)

*Primary Examiner* — Steve Rowland
(74) *Attorney, Agent, or Firm* — RAY QUINNEY & NEBEKER P.C.; John O. Carpenter

(57) ABSTRACT

A method of recommending an unplayed game application to a user includes obtaining a game history associated with a user profile, wherein the game history includes at least one game record of a game application the user profile has been used to play, and evaluating the game history to obtain a plurality of game events associated with a game application of the game history. The method further includes accessing a table of tags associated with the plurality of game events associated with the game application, aggregating a plurality of tags in a tag list in the user profile based at least partially on the table of tags and the plurality of game events, and presenting to the user a recommendation of an unplayed game application based at least partially on the plurality of tags.

20 Claims, 5 Drawing Sheets

(56) References Cited

U.S. PATENT DOCUMENTS

| | | | |
|---|---|---|---|
| 2013/0184070 A1 | 7/2013 | Gadher et al. | |
| 2013/0273996 A1* | 10/2013 | Froy, Jr. | G07F 17/3218 463/20 |
| 2013/0303274 A1* | 11/2013 | Gadher | G07F 17/3209 463/29 |
| 2013/0344940 A1* | 12/2013 | Kurabayashi | A63F 13/47 463/23 |
| 2014/0194178 A1* | 7/2014 | Kawada | G07F 17/3225 463/31 |
| 2014/0274355 A1* | 9/2014 | George | G06Q 30/0631 463/29 |
| 2015/0278692 A1* | 10/2015 | Milewski | H04L 67/01 706/46 |
| 2016/0321855 A1* | 11/2016 | Jordan | G07F 17/323 |
| 2017/0266565 A1* | 9/2017 | Choudhuri | A63F 13/44 |
| 2022/0108358 A1* | 4/2022 | Sun | G06N 20/20 |
| 2022/0118364 A1* | 4/2022 | de Mesentier Silva | A63F 13/69 |
| 2023/0078380 A1* | 3/2023 | Zaghetto | A63F 13/67 463/23 |
| 2023/0097716 A1* | 3/2023 | McMullen, V | H04L 9/3226 463/29 |
| 2023/0102506 A1* | 3/2023 | McMullen, V | G06Q 50/2057 463/42 |
| 2023/0177583 A1* | 6/2023 | Fear | A63F 13/795 705/26.7 |

OTHER PUBLICATIONS

"Invitation to Pay Additional Fees Issued in PCT Application No. PCT/US23/020095", dated Jul. 11, 2023, 12 Pages.

* cited by examiner

SYSTEMS AND METHODS FOR RICH PERSONALIZATION OF COMPUTER GAME EXPERIENCES

BACKGROUND

Background and Relevant Art

Users face many choices when selecting a game application to play on a personal computer or video game console. Many game applications can require dozens of hours to complete, and user's time can be limited. Further, due to amount of gameplay available in or provided by a single game application, even avid users can have a user profile with a limited quantity of games played by that user profile. Customized recommendations based on experiences, events, achievements, and decisions within a game application can provide more relevant information to users.

BRIEF SUMMARY

In some embodiments, a method of recommending an unplayed game application to a user includes obtaining a game history associated with a user profile, wherein the game history includes at least one game record of a game application the user profile has been used to play, and evaluating the game history to obtain a plurality of game events associated with a game application of the game history. The method further includes accessing a table of tags associated with the plurality of game events associated with the game application, aggregating a plurality of tags in a tag list in the user profile based at least partially on the table of tags and the plurality of game events, and presenting to the user a recommendation of an unplayed game application based at least partially on the plurality of tags.

In some embodiments, a method of recommending an unplayed game application to a user includes obtaining a game history associated with a user profile, wherein the game history includes at least one game record of a game application the user profile has been used to play, and evaluating the game history to obtain a plurality of game events associated with a game application of the game history. The method further includes accessing a table of tags associated with the plurality of game events associated with the game application and aggregating a plurality of tags in a tag list in the user profile based at least partially on the table of tags and the plurality of game events. The method further includes identifying a gameplay event during user gameplay, obtaining a new tag associated with the gameplay event, and adding the new tag to the plurality of tags in the user profile. The method includes presenting to the user a recommendation of an unplayed game application based at least partially on the plurality of tags.

In some embodiments, a method of recommending an unplayed game to a user includes accessing an unplayed game list, comparing one or more game property tags of a plurality of unplayed games to a tag list of a user profile, ranking at least a portion of the plurality of unplayed games based at least partially on the tag list, and presenting to the user a recommended game based at least partially on a ranked plurality of unplayed games.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
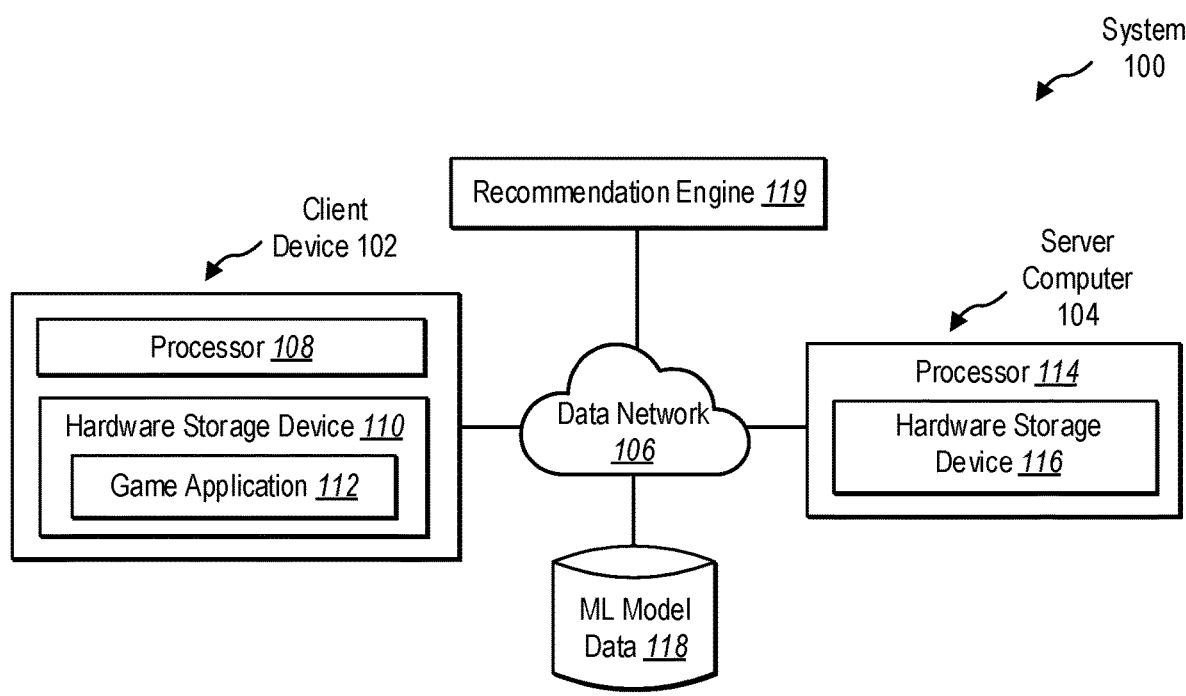
FIG. 1 is a system diagram of a computing device in communication with a network, according to at least some embodiments of the present disclosure.

The present disclosure generally relates to systems and methods for recommending video games to a user. More particularly, the present disclosure relates to providing a more complete recommendation to a user for new gameplay experiences based at least partially on the user's gameplay preferences and styles measured during gameplay of one or more game applications. In some embodiments, the choices made during gameplay by a user are detected and/or measured to populate a user profile with experience properties in addition to or alternative to a conventional list of games played by the user.

For example, a recommendation engine accesses a plurality of tags associated with a user profile. The plurality of tags are representative of a plurality of choices and experiences that have occurred during the use of the user account to play one or more video games. For example, a tag may be associated with a game application, itself, wherein the user profile includes tags related to the genre, publisher, developer, platform, or date of publication of a game application. In other examples, a tag is associated with one or more modes of gameplay selected by the user account (on behalf of the user) while playing a game application. In a particular example, a tag is associated with certain multiplayer modes of a game application, indicating the user's preference for that game mode. In another example, a tag is associated with certain decisions made during gameplay, such as narrative decisions in a game application that may alter the user's experience or an ending of the game application story.

By aggregating the tags in the user profile, a plurality of tags can inform the recommendation engine of the user's gameplay preferences based upon a single game. For example, conventional recommendation systems associate a game application or other product with one or more tags that are describe the game application, such as genre. However, a game application is an interactive form of media, allowing the user greater degree of freedom to enjoy and engage with the game application in a variety of manners than other forms or media. In an example, a user may choose to only or predominantly play the multiplayer mode(s) of a game and not play the single player or "campaign" mode of the game application. In another example, a user may choose to only or predominantly play the single player or "campaign" mode of the game application while avoiding or "bouncing off" the multiplayer mode(s) after trying the multiplayer mode(s) once or infrequently and not returning to the multiplayer mode(s). In a conventional recommendation system, the user may be presented with games that share characteristics with the portions of the game application that the user did not enjoy or with which the user did not spend significant time engaged.

In some embodiments, a recommendation engine according to the present disclosure detects, collects, records, aggregates, and combinations thereof the events and behaviors of the user during the gameplay of one or more game applications to provide a more complete representation of the user's preferences and gameplay in the user profile. While examples and embodiments will be described herein that relate to user profiles includes tags from a single game and to tags from multiple games, it should be understood that systems and methods according to the present disclosure may provide improved recommendations to the user based on playing a portion of a single game, completing multiple games, or any amount or type of gameplay therebetween.

In some embodiments, a recommendation engine includes a fixed set of tags that represent a plurality of categories of gameplay across a variety of game applications. For example, a tag (e.g., "Player versus Player" or "PVP") associated with competitive multiplayer may be associated with a plurality of game applications that offer PVP multiplayer modes. In other examples, a tag (e.g., "Completionist") associated with unlocking at least a threshold percentage or all of the achievements or trophies associated with a game application may be associated with all game applications that offer achievements or trophies on a video game platform. In some embodiments, a recommendation engine includes a dynamic set of tags that are at least partially based on community engagement and/or behavior, as will be described in more detail herein.

In some embodiments, the video game platform hosted on one or more server computers includes the recommendation engine. In some embodiments, the recommendation engine resides locally on a local computing device of the user (such as a general-purpose computing device used to play a game application, or a specialized computing device such as a video game console). In some embodiments, the recommendation engine is hosted and executed independently from the server computers providing the video game platform or from the local computing device executing the game application. For example, the local computing device and the server computer(s) of the video game platform are in data communication via a network, and the recommendation engine is further in data communication with the local computing device and the server computer(s) of the video game platform via the network. The recommendation engine can receive data from the local computing device and/or the server computer(s) of the video game platform to receive information from the user profile and/or to create the user profile.

The user profile is, in some embodiments, part of the recommendation engine. For example, the recommendation engine may detect, receive, obtain, aggregate, or combinations thereof information related to the user gameplay to create a user profile stored in the recommendation engine for the user. In other embodiments, the recommendation engine obtains information from a user profile that is stored locally on the local computing device used to execute the game application(s). In other embodiments, the recommendation engine obtains information from a user profile that is stored remotely from the local computing device on one or more server computers.

In some embodiments, a fixed set of tags are determined by the operator of the video game platform. For example, the user profile may be associated with a particular video game platform from which the game application is purchased, rented, downloaded, or on which the game application is played, either in single player or multiplayer modes. The operator of the video game platform may determine the tags to provide a uniform set of tags that are recognizable and interoperable between game applications on the video game platform.

The operator of the video game platform may associate or assign a tag from the fixed set of tags to one or more game events, modes, or other aspects of the game application. An operator of the video game platform commonly approves a game application for distribution and/or play on the video game platform. In some embodiments, the operator of the video game platform associates or assigns a tag to a game event, mode, or other aspect of the game application during the review and approval process. In other embodiments, a publisher or a developer of the game application associates or assigns a tag from the fixed set of tags provided by operator of the video game platform. In doing so, the publisher or developer can select the aspects of the game application considered most integral to the user's experience and engagement with the game application to associate with tags.

In at least some embodiments, one or more tags may be automatically associated and/or assigned based on event detection. For example, a tag of the fixed set of tags may be related to a round victory or a victory over a campaign boss character. While the video game platform may provide achievements, individual round victories or a victories over a campaign boss character may not be tracked or recognized by the achievements previously associated with the game application. Event detection through object detection, animation detection, or optical character recognition (OCR) may allow for the detection and recording of game events and tags not assigned at the publication of the game. Additionally, game event detection may allow for similar game events across a plurality of game applications to be identified with similar tags to provide consistent tracking and aggregation of user preferences and experiences across multiple game applications. In at least some embodiments, the game event detection is at least partially performed by a machine learning (ML) model.

At least some tags may be community created. For example, many video game communities capture, share, and engage with screen captures and/or recordings of gameplay on various social media platforms. In some embodiments, a recommendation engine may obtain comparison videos from a social media platform and identify game events within the comparison videos that are popular amongst the community of the game application or similar game applications. The recommendation engine may create additional tags or associate one or more existing tags of the fixed sets of tags with the game events that are identified in comparison videos from social media. In at least one example, a game event in a game application may be unassociated with a tag from the developer, publisher, or operator of the video game platform, but may develop a significance within the community. A recommendation engine may identify such game events and associate a tag with those events that allows the recommendation of games with similar popular or viral events within gameplay.

In some embodiments, a system for detecting and recording game events from video information or user gameplay includes a client device and a server computer in communication via a data network, such as illustrated in FIG. 1. The system 100 includes a client device 102 and a server computer 104 in communication via a data network 106. In some embodiments, the client device 102 is a computing device with a processor 108 and hardware storage device 110 in communication with the processor 108. In some embodiments, the hardware storage device 110 is any non-transient computer readable medium that may store instructions thereon. The hardware storage device 110 may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device 110 is local to and/or integrated with the client device 102. In some embodiments, the hardware storage device 110 is accessed by the client device 102 through a network connection.

The processor 108 may execute a game application 112 that is stored on the hardware storage device 110 to render video information at least partially in response to user inputs to the client device 102. In some embodiments, the client device 102 includes a display device to display the video information to a playing user. For example, the client device 102 may be a dedicated gaming console with an integrated display or a general-purpose computer with an integrated display (e.g., a laptop computer). In some embodiments, the client device 102 is in communication with a display device to display the video information to a playing user. For example, the client device 102 may be a gaming console (e.g., MICROSOFT XBOX) that outputs the video information to a connected display device (e.g., a television) for display to a playing user.

In some embodiments, the video information or a portion of the video information is also transmitted to a server computer 104 via a data network 106. In some embodiments, the server computer 104 is located remotely from the client device 102 and the data network 106 is or includes the World Wide Web. For example, the client device 102 may be connected to the data network 106 via the playing user's home internet connection, and the server computer 104 may be located in a datacenter. In some embodiments, the server computer 104 is located locally to the client device 102 and the video information is transmitted over a local area network or a direct data connection. For example, a competitive electronic game tournament (e.g., an eSports competition) may have a local data network 106 to which all client devices 102 used for the competition are connected. A server computer 104 connected to the local data network 106 may communicate with the client devices 102 used for the competition.

In some embodiments, the server computer 104 receives the video information from the client device 102 via the data network 106. The server computer 104 includes a processor 114 and a hardware storage device 116 in data communication with the processor 114. The hardware storage device 116 has instructions stored thereon that, when executed by the processor 114, cause the server computer 104 to perform any of the methods described herein. For example, the server computer 104 may detect events in the video information to classify different events and/or objects based on identified textures, models, animations, or other criteria.

In at least one embodiment, the server computer 104 includes or is in communication with an ML model that detects and/or reports game events in the video information to evaluate the video information and identify and tag game events. In some embodiments, the server computer 104 has stored thereon (e.g., in the hardware storage device 116) a ML model that accesses and/or communicates with ML model data 118. In some examples, the ML model data 118 is stored locally to the server computer. In some examples, the ML model data 118 is stored remotely from the server computer 104 and accessed by the server computer 104 via the data network 106. For example, the ML model data 118 may be aggregated from and/or refined by a plurality of ML models executed by a plurality of server computers. The ML model data may be updated based on the outputs of the ML models, with the most current ML model data made available for the ML model running on the server computer 104 when needed.

The recommendation engine 119 is, in some embodiments, in data communication with the network 106 to communicate with the client device 102, the server computer 104, and/or the ML model data 118. The recommendation engine 119, as described herein, may be stored on and/or executed on the server computer 104, the client device 102, another remote computer, or combinations thereof.

As illustrated in the foregoing discussion, the present disclosure utilizes a variety of terms to describe features and advantages of the ML model. Additional detail is now provided regarding the meaning of such terms. For example, as used herein, an "ML model" refers to a computer algorithm or model (e.g., a classification model, a regression model, a language model, an object detection model) that can be tuned (e.g., trained) based on training input to approximate unknown functions. For example, a ML model may refer to a neural network or other ML algorithm or architecture that learns and approximates complex functions and generate outputs based on a plurality of inputs provided to the ML model.

In some embodiments, a ML system, model, or neural network described herein is an artificial neural network. In some embodiments, a ML system, model, or neural network described herein is a convolutional neural network. In some embodiments, a ML system, model, or neural network described herein is a recurrent neural network. In at least one embodiment, a ML system, model, or neural network described herein is a Bayes classifier. As used herein, a "ML system" may refer to one or multiple ML models that cooperatively generate one or more outputs based on corresponding inputs. For example, a ML system may refer to any system architecture having multiple discrete machine learning components that consider different kinds of information or inputs.

As used herein, an "instance" refers to an input object that may be provided as an input to a ML system to use in generating an output, such as events within video information. For example, an instance may refer to any virtual object provided in the user interface (UI) of the video information. For example, a UI may present notifications to a user in response to certain game events. The ML system may perform one or more machine vision techniques to evaluate the video information for associated events when the UI notification is present. The ML system may refine over iterations to "learn" when visual game events are correlated with the UI notification. For example, a UI element indicating player avatar health may increase in value in response to the player avatar interacting with a health pack in the game environment.

In some embodiments, the ML system can create an application module of expected or correlated game events in the video information. In a particular example, if the UI element indicates that the playing user has performed an opponent elimination, other aspects of the video information may be detected and/or identified to associate opponent eliminations with the identified animation. In another example, each time a player avatar performs an assist, the ML system may identify to whom the player avatar passed the ball for the goal (such as in sports games). Further, the ML system can create or refine an application module to include commonly queried or associated categories of tags for events. In some examples, all key events may be associate with a match timestamp, while opponent eliminations, specifically, further include tags indicating what weapon the player avatar had equipped at that time. In some examples, a player elimination key event may include tags associated with the name of the opponent that eliminated the player and/or the weapon that was used to eliminate the player. The tags may allow the ML system and/or the recommendation engine to determine a preferred playstyle within a game application. For example, a role-playing game with many options for avatar class or skills may interest different users for different reasons. A user profile may record or aggregate tags that indicate a preferred playstyle (such as a healer in a massively multiplayer online RPG or a mage in a competitive multiplayer online battle arena) that is not otherwise captured in a game history or achievements.

An instance provided to the ML system may further include other digital objects including text, identified objects, or other types of data that may be parsed and/or analyzed using one or more algorithms. In one or more embodiments described herein, an instance is a "training instance," which refers to an instance from a collection of training instances used in training a ML system. Moreover, an "input instance" may refer to any instance used in implementing the machine learning system for its intended purpose. As used herein, a "training dataset" may refer to a collection of training instances. In some embodiments, a training dataset includes a plurality of frames of video information.

In some embodiments, systems and methods described herein obtain a training dataset and identify one or more labels of the instances of the training dataset to detect events based on a comparison of labeled events against an application module. In some embodiments, the application module is predetermined, such as by a developer or publisher of the game application. In some embodiments, the application module is developed and refined by the ML system by iterations of processing video information.

Figure 2:
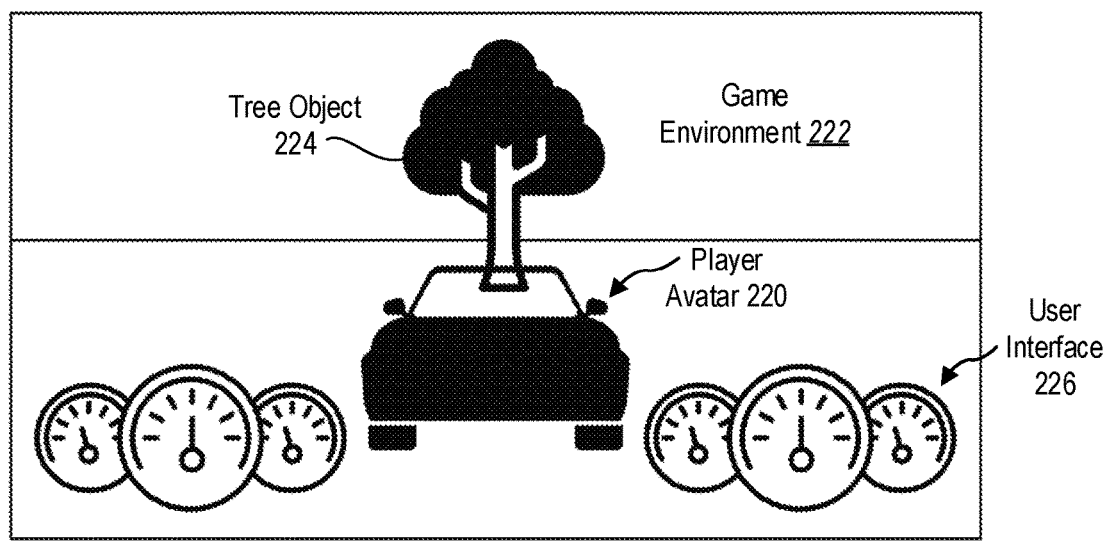
FIG. 2 is a frame of video information used to detected game events, according to at least some embodiments of the present disclosure.

FIG. 2 is an embodiment of a frame of video information that may be used for identifying events within the user's gameplay. In FIG. 2, a frame of video information includes an object 224 (e.g., a tree) positioned in the game environment 222 with the player avatar 220, in this case a car. Other objects in the frame include the user interface 226 which may be independent of the three-dimensional game environment 222. The machine vision may identify the position, size, and shape of the tree object 224 relative to the player avatar 220 to determine relative position of the object 224 and the avatar 220 in the game environment 222. By evaluating the relative position of the object 224 and the avatar 220 in one frame or a sequence of frames (adjacent frames at the native framerate or non-adjacent key frames), the machine vision and/or ML system may identify a crash between the car and the tree. The crash may be identified as a key event and denoted as such relative to the social media metrics.

In some embodiments, the video information provided by the client device running the game application is associated with game state data. Game state data includes any information that may allow a second electronic device to recreate a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

Because the video information can be associated with the game state data, object identifications (IDs) may be associated with the objects detected in the video information, allowing higher reliability in the object detection. Additionally, the game state data may include object IDs, which can be compared to the detected objects to refine a ML system of the machine vision and improve the object detection of the system.

In some embodiments, machine vision and/or object detection can measure relative motion of edges to determine the position of virtual objects. For example, a detected object that does not change position within the frames across a plurality of frames of the video information while the avatar moves and/or the user's perspective relative to the game environment moves may be an element of the UI 226. In other examples, a detected object that increases in size differently than the other objects in the game environment may be moving relative to the game environment. In the illustrated embodiment in FIG. 2, a crash key event may be identified by a change in the UI 226 depicting the speedometer rapidly and/or suddenly decreasing in value. For example, a rapid change in the UI 226 reflecting a change in speed of the car avatar 220 from 150 kilometers per hour (kph) to 0 kph in under 1.0 seconds may be identified as a crash.

A virtual object, as used herein, may include any object or element rendered or presented by the client device in the process of running the game application. For example, a virtual object may be an element of the UI 226. In some examples, a virtual object may be a player avatar 220. In some examples, the virtual object may be wall, floor, or other geometry of the game environment 222 such as a tree object 224. In some examples, the virtual object may be an interactive or movable object within the game environment, such as a door, crate, or power-up.

In some embodiments, the machine vision and/or ML model can identify objects in the game environment 222 without explicit training to identify the object. For example, a machine vision system that includes ML may learn to identify tree objects 224 within the game environment 222, even if the particular model of tree object 224 has not been explicitly taught to the machine vision system. In at least one example, systems and methods according to the present disclosure may be portable between video information from a variety of game applications where different models for common objects, such as the tree object 224, are used. By training the ML model, the machine vision may be able to recognize and detect a tree object 224 in the video information. In some examples, elements of the game environment are procedurally generated. A series of procedurally generated tree objects 224 may include common elements but be distinct models from one another, as rendered in the video information. Therefore, an explicitly provided model would be inapplicable to procedurally generated tree objects 224.

In some embodiments, the machine vision system invokes an application module that is associated with the game application that is the source of the video information. Art styles can vary considerably between game applications. Even a ML model that has been trained on video information from a plurality of game applications to detect tree objects 224 may fail when presented with a new art style. For example, while both FORNITE and CALL OF DUTY are competitive first-person shooter games, the appearance of objects is very different between the games. Specifically, tree objects 224 and other elements of the game environment 222 appear very different between the two game applications.

Systems and methods according to the present disclosure may access an application module that is associated with the game application that is the source of the video information. The application module may be generated by the ML model based on the game engine, may include predetermined or user-defined events, or combinations of both.

As described herein, the ML model data may be stored remotely to the client device and/or the server computer and be accessed by the server computer as needed based on the video information or other information provided by the client device. In at least one embodiment, the ML model data is part of an application module including game application-specific information for machine vision and/or event identification and classification.

In some embodiments, social media metrics of a comparison video(s) obtained from the social media platform (e.g., "likes", shares, comments, views, saves, or other social media metrics) may be reported to the ML model and/or ML model data to further refine the ML model based on other user's reactions to the events and/or the associated tags. For example, a clip published to social media showing an elimination performed at very low resource levels in a multiplayer online battle arena (MOBA) game may spur greater social engagement than a single elimination performed with high resource levels. The ML model may, therefore, refine and train over time to identify and/or highlight events which are correlated to high levels of social engagement on social media.

The ML model may allow for identification of objects and/or events with tags associated therewith. The object detection may include any of the methods or techniques described herein to identify the virtual objects in the video information. In some embodiments, the method includes determining the presence of a key event, a popular event, a rare event, or any other type of event based on the present of the object, texture, model, or animation. In some embodiments, determining the presence of an event includes evaluating a change in the virtual object, texture, model, or animation between frames of the plurality of frames. In some embodiments, compared frames are adjacent frames in the native framerate of the rendered game environment. For example, the video information may include 60 frames per second as the client device renders the game environment at 60 frames per second. The compared frames may be adjacent frames in the native 60 frames per second with a delta of approximately 16.67 milliseconds between frames. In some embodiments, the compared frames are key frames or other non-adjacent frames in the native framerate. For example, the video information may include 60 frames per second as the client device renders the game environment at 60 frames per second, but the compared frames are selected 0.25 seconds apart from one another or approximately 15 frames apart.

The changes to the virtual object between the first frame and the second frame may be calculated based on changes relative to the game environment, or changes based on expected correlations. Some changes in the virtual object relative to the game environment may include the appearance or disappearance of the virtual object in the game environment. The comparison of frames may include the detection of a particular animation of an avatar model or other model. A comparison of frames may include the detection of change in textures skinning a model, which may be associated with an event such as receiving damage or acquiring a new piece of equipment in the game.

Figure 3:
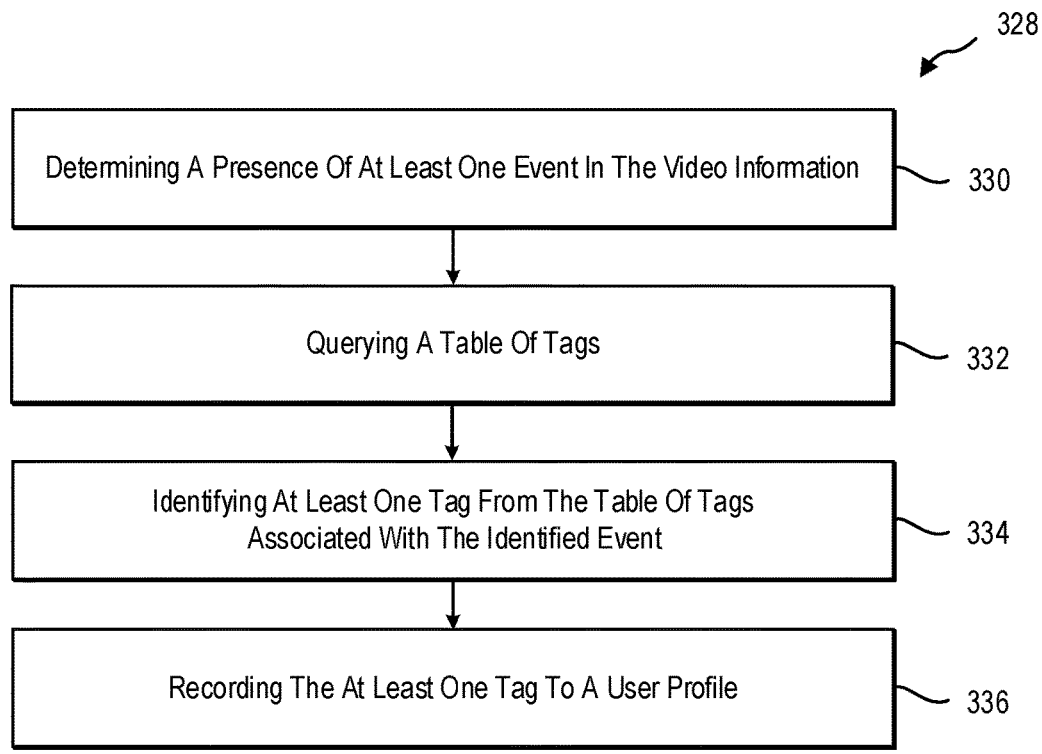
FIG. 3 is a flowchart illustrating a method of recording tags based on game events, according to at least some embodiments of the present disclosure.

FIG. 3 is a flowchart illustrating an embodiment of a method 328 of identifying events in video information from a video game performed at a server computer (e.g., server computer 104 of FIG. 1) or a client device (e.g., client device 102 of FIG. 1). In at least one example, the client device presents to a user video information that is rendered at a remote computer, such as during cloud-based gaming. In some embodiments, the method 328 can be performed on any source of video information from a game application (e.g., game application 112 of FIG. 1), such as gameplay recordings, recreated renderings of a gameplay session based on game state data, or from live streams of the gameplay. For example, obtaining the video information may include obtaining the video information in real-time as the video information is generated by the processor(s) of the client device (e.g., during live streaming of gameplay). In some examples, obtaining the video information includes accessing a recording of the gameplay that was generated by the processor(s) of the client device after the fact, such as from archived gameplay recordings and/or game state data posted on a social media platform.

The method 328 includes evaluating at least one frame of the plurality of frames of the video information at to identify a virtual object, texture, model, or animation. After identifying the virtual object, texture, model, or animation in the frame, the method includes determining a presence of at least one event associated with the detected element at 330.

In some embodiments, the determining the presence of at least one event in the video information includes comparing the detected object, texture, model, or animation to one or more events of an application module. As described herein, the application module may be predetermined or may be generated by a ML, system. In some embodiments, the application module includes key events, popular events, rare events, any other types of events, or combinations thereof.

In at least one embodiment, key events are events that progress a gameplay session toward a resolution or definitive outcome. In some embodiments, key events may be predetermined in the application module specifically for the game application being played. Key events for an American football game application may include a touchdown, field goal, fumble, fumble recovery, sack, interception, punt, kickoff, halftime, or full time. Key events for a first-person shooter (FPS) game application may include an opponent elimination, a player elimination, a health pickup, a shield pickup, a reload, a multi-elimination, a round victory, a teammate elimination, a flag pickup, or a point capture. Key events for a MOBA game application may include an opponent elimination, a player elimination, a health pickup, a shield pickup, an ability usage, a cooldown expiration, a multi-elimination, a round victory, a teammate elimination, player-versus-environment (PvE) elimination; or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interests to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, which are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players. Experience of rare events may be associated with a specific type of player interested in exploring the details of the game environment or game application, and tags associated with rare events can assist in providing relevant information in the user profile.

In some embodiments, the application module includes probability tables that allow the detection of rare events in the video information. For example, drop tables for a role-playing game may control the probability that a game engine provides a particular item to the player avatar in the game environment. If an item has a drop rate of 5.0%, a single detection of the item in the video information is, while uncommon by design, non-anomalous. However, if the method or system described herein detects the item dropping 5 out of 20 chances (a 0.000000147% chance), the sequence may indicate a rare event of interest. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate rare event of interest. The application module may include threshold values to determine when a series of probable events becomes sufficiently rare to be designated a rare event. In some embodiments, a probability curve may be calculated based on the drop table or other probability table, and a threshold may be set at a standard deviation away from a most likely outcome. In another embodiment, the threshold may be set manually, such that a detected rare event or sequence of events is reported when the occurrence exceeds the manually set threshold.

While some embodiments of systems and methods for identifying and/or tagging events a user evaluate only video information, some embodiments evaluate other forms of information or data to supplement the video information. In some embodiments, the gameplay obtained further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment.

In some embodiments, the video information includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

The video information and events identified therein may be associated with a tag or a category of tags in the application module and/or in the recommendation engine. The method 328 further includes querying a table of tags at 332 and identifying a tag associated with the identified event at 334. For example, in a first game application, an identified event in related to healing a co-operative teammate in an MMORPG may be associated with a "co-operative" tag or "team player" tag. In another game application, providing an assist to a teammate in a sports game application may be associated with the same tags, despite the actual event being different. The aggregation of multiple iterations of a tag within a user profile can increase the influence that tag has on the user profile.

The method 328 includes recording the identified tag to a user profile at 336. In some examples, the tag is recorded in the user profile independent of the game application being played. In some examples, a plurality of tags are recorded for a single identified event. The aggregation of multiple iterations of a tag within a user profile can increase the influence that tag has on the user profile.

Figure 4:
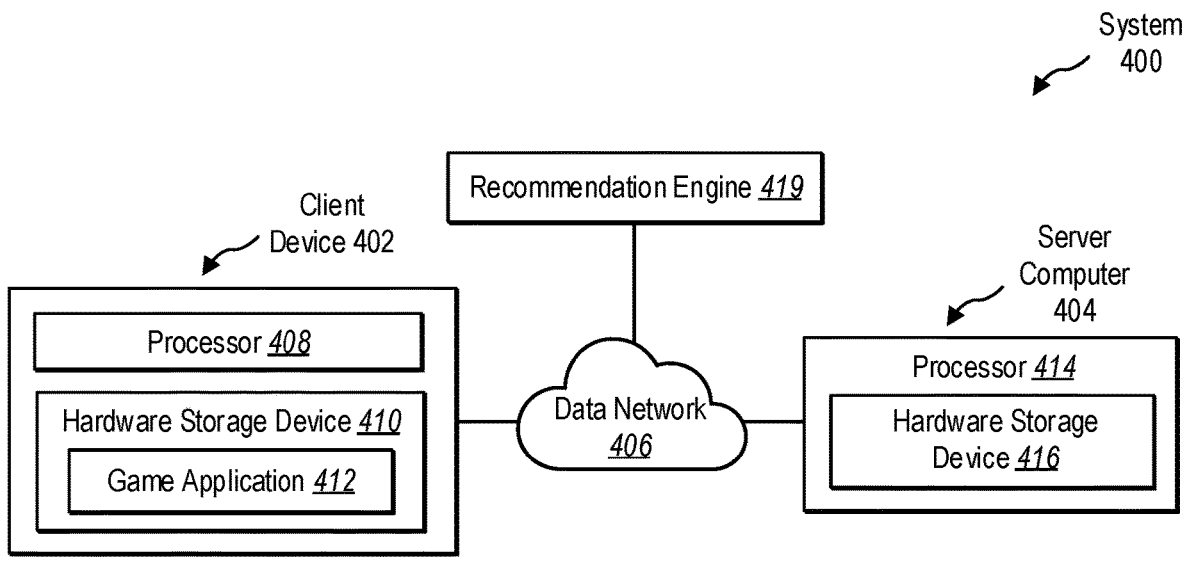
FIG. 4 is a system diagram illustrating network communications used to detect game events and record tags, according to at least some embodiments of the present disclosure.

In other examples, the recommendation engine detects network communications between a client device and a game server computer, where the network communications indicate user decisions within the game application. FIG. 4 is an embodiment of a system 400 where the client device 402 is in data communication with a server computer 404 via a network. In some examples, the server computer 404 provides information to the client device 402 for at least some portions of the game application 412 executed by the processor 408 from the hardware storage device 410. For example, the processor 408 may receive network communications from the server computer 404 regarding game state for online multiplayer matches of the game application. A recommendation engine 419 detects the game state communications between the client device 402 and the server computer 404 to identify events or modes within the game application 412 executed by the processor 408 of the client device 402. In at least one example, the recommendation engine 419 detects a matchmaking request from the client device 402 to the server computer 404 to initiate an online competitive PVP match in the game application 412. In at least another example, the recommendation engine 419 detects a support request from the game application 412 to allow another user to assist the user (or the client device 402) in the single player campaign mode of the game application 412.

In some embodiments, the recommendation engine 419 detects network communications between the client device 402 and the server computer 404 related to achievements or trophy completions. For example, most achievements or trophy completions are stored at a server computer 404 (on the hardware storage device 416, via the processor 414) to allow a user to access his or her achievement list (and progress toward achievement completion) from a plurality of network-connected devices. A network communication related to an achievement or trophy is, therefore, communicated to the server computer 404 upon completion of the achievement or trophy at the client device 402 executing the game application 412. The network communication can inform the recommendation engine 419 of achievements and/or trophies, for which the recommendation engine 419 can query a table of tags and record one or more tags to the user profile.

In some embodiments, the network communications between the client device 402 and the server computer further include game statistics, such as total time played, time played in multiplayer, total quantity of matches played, total number of eliminations, total number of heals, in-game ranking, PVP ranking, etc. In some embodiments, the game statistics are related to a game profile that the user may share between platforms. For example, a competitive online game application may allow cross-platform play with different user accounts associated with a single game profile specific to the game application. In at least one example, a first user account associated with a video game console platform and a second user account associated with a personal computer platform are both associated with (e.g., linked to) a game profile that shares cumulative game statistics between both user accounts used to play the game application. In some examples, the recommendation engine 419 detects network communications related to the cumulative game statistics of the game profile, allowing the recommendation engine 419 to identify and record tags related to cross-platform play.

Figure 5:
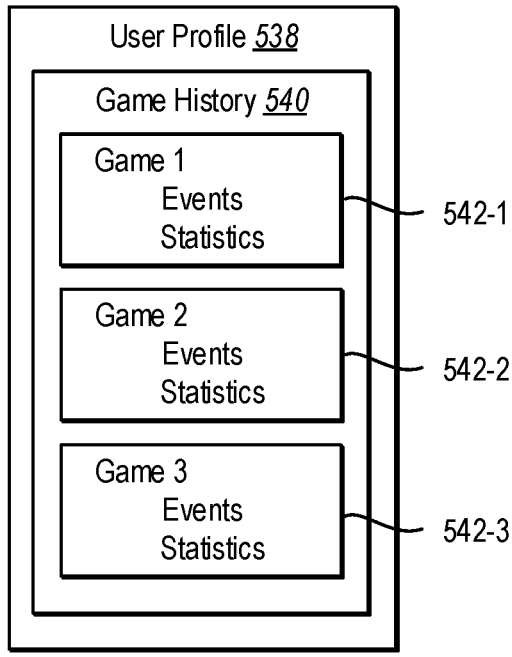
FIG. 5 is a user profile containing a game history, according to at least some embodiments of the present disclosure.

FIG. 5 is an embodiment of a user profile 538 that may be accessed by or stored in the recommendation engine. In some embodiments, the user profile 538 includes a game history 540 with a plurality of game records 542-1, 542-2, 542-3 associated therewith. The game records 542-1, 542-2, 542-3 include one or more events and/or game statistics for each game. For example, the events may include identified events (such as key events) based on the object detection and/or event detection described herein or based on identified achievements or trophies completed while playing using the user profile 538. The game statistics reflect the cumulative actions or time spent playing the game application with the user profile, and may include game statistics that are tracked by the game application or statistics measured by the user profile (such as total time) or by the ML system or recommendation engine (such as total matches played, eliminations, wins, losses, healing, levels completed, playthroughs completed, etc. that are identified through the object detection and/or event detection described herein).

In some embodiments, a recommendation engine accesses or obtains one or more game records 542-1, 542-2, 542-3 in the user profile to determine tags associated with the game events and/or game statistics. For example, the recommendation engine may query a table of tags for any tags associated with a first event of the first game record 542-1. When an associated tag is identified, the recommendation engine then records the associated tag to a tag list. Similarly, the recommendation engine may query a table of tags for any tags associated with a game statistic of the first game record 542-1. When an associated tag is identified, the recommendation engine then records the associated tag to a tag list. The recommendation engine may repeat the process for each of the game records.

Figure 6:
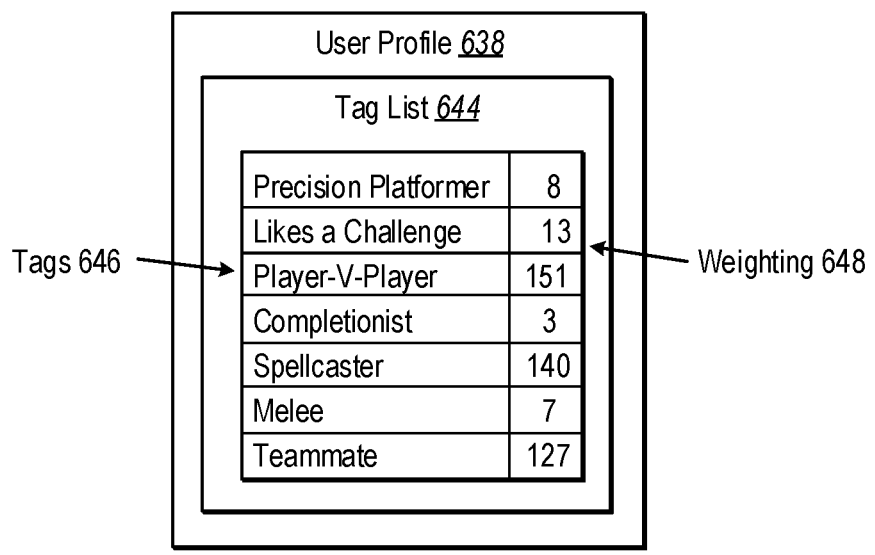
FIG. 6 is a user profile containing a tag list, according to at least some embodiments of the present disclosure.

In some embodiments, the tag list 644 is stored in the user profile 638, such as illustrated in the embodiment of FIG. 6, which can reduce and/or eliminate the need for redundant querying and recording of tags. The recommendation engine may record the tags 646 with a quantity or weighting 648 of the respective tags 646 in the tag list 644. In some embodiments, the relative quantity or weighting 648 of the tag 646 allows the recommendation engine to evaluate the user's preferences and experiences during gameplay to tailor recommendations for new unplayed games. It should be understood that while the recommendations herein are described as being for unplayed games, the recommendation engine may also recommend previously played games that exceed a time period of having been unplayed or a game in the game history that the user "bounced off" and only played for a short period of time. In other words, the recommendation engine may recommend an unplayed game that is new to the user profile or a game that is functionally "unplayed" because the user has not played the game within a sufficiently long time period (e.g., 1 year, 3 years, 5 years, on the current generation of console, etc.) or has not played the game enough.

FIG. 6 illustrates an example tag list 644 for a user profile 638 that has been used to predominantly play a support-role spellcaster in competitive multiplayer. For example, while the tag list 644 includes "Precision platformer" and "Completionist", the weighting 648 associated with those tags 646 is relatively low compared to the weighting 648 of "Player-v-player", "Spellcaster", and "Teammate" tags 646.

In some embodiments, the weighting 648 is based at least partially on a number of times the particular tag 646 has been recorded to the tag list 644 from unique events, achievements, game statistics, etc. For example, the "Completionist" tag 646 may be recorded when the user profile 638 is associated with completing 100% of achievements or trophies in a game application. For each game record in a game history (such as described in relation to FIG. 5) that reflects all achievements or trophies have been completed, the recommendation engine may assign an instance of the "Completionist" tag 646. In another example, the recommendation engine may record an instance of the "Player-v-player" tag 646 each time a competitive matchmaking request network communication is detected and/or each time a competitive PvP round is completed.

In some embodiments, the weighting 648 is a relative weighting between tags 646. In some examples, the weighting 648 is based at least partially on a duration of time played for the game application (or game record) associated with an instance of the tag 646. For example, the weighting 648 of the "Spellcaster" tag 646 may reflect the user profile 638 being used to play as a spellcaster-class character in any game application for 140 hours relative to only 7 hours played as a melee-class character in any game application.

In other examples, the weighting 648 is based at least partially on an estimated or calculated time to earn the tag 646. For example, the "Completionist" tag may be assigned a greater weighting 648 because the "Completionist" tag is related to completing all of the achievements or trophies in a game, which inherently includes completing or experiencing many events that are each associated with other tags. In the prior example, the weighting for the "Spellcaster" tag 646 is based on the number of hours played as that class of character. In some embodiments, each instance of the "Completionist" tag 646 recorded to the tag list 644 may be assigned a weighting 648 of 100, based on the estimated 100 hours required to achieve each instance of the "Completionist" tag 646.

Figure 7:
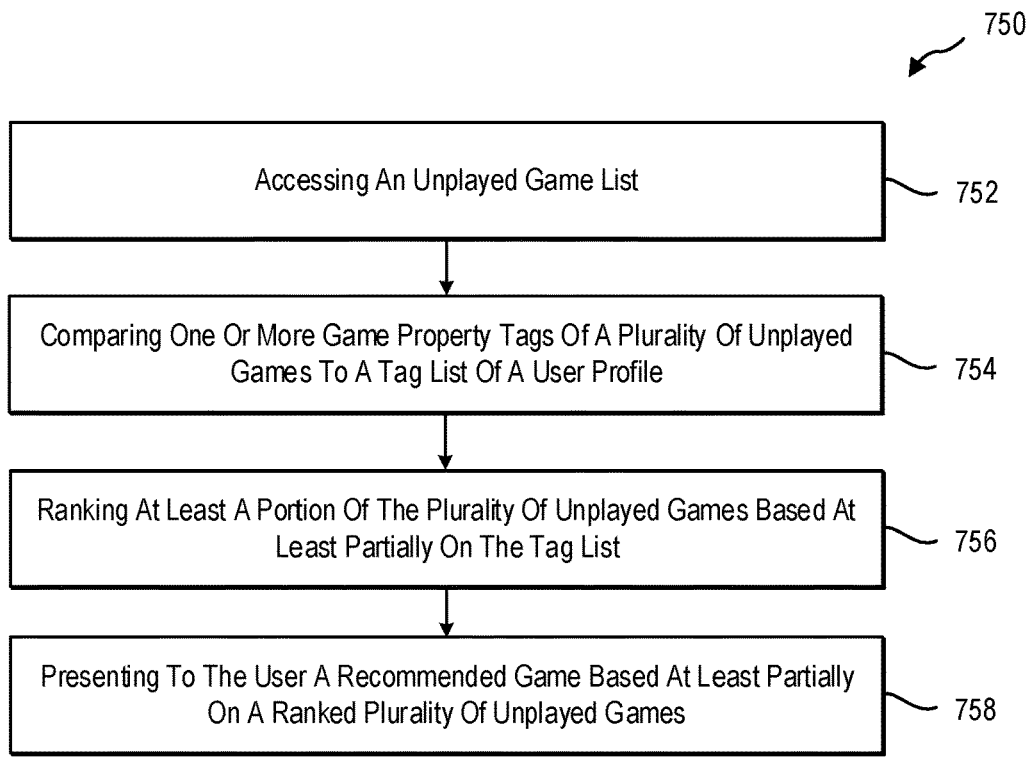
FIG. 7 is a flowchart illustrating a method of recommending unplayed games to a user, according to at least some embodiments of the present disclosure.

FIG. 7 is a flowchart illustrating an embodiment of a method for recommending an unplayed game to a user. The method 750 includes accessing an unplayed game list at 752. In some embodiments, accessing the unplayed game list includes comparing a game history of a user profile to an available game list. For example, the user profile may be associated with a video game platform, such as a video game distribution platform, a video game multiplayer platform, a video game social platform, or another online video game platform that allows users to communicate with the video game platform to access available game applications or portions of game applications. In a specific example, a video game distribution platform includes a library of game applications that are available for download to a client device, and the downloaded game application is executable on the client device. In another example, a video game distribution platform is a cloud-based video game platform that allows a client device to access and interact with game applications stored and executed on a remote server. In some embodiments, the unplayed game list includes game applications available for download to a client device and/or available for cloud-based access and interaction.

The unplayed game list includes at least one game application that is present in the available game list and not present in the game history of the user profile. In some embodiments, the unplayed game list includes at least one game application present in the game history that the user profile has not accessed or played within a predetermined time period. In one example, the unplayed game list may include any game application in the available game list that is not in the game history or that the user profile has not accessed or played within 3 years. In such examples, the method 750 allows for the recommendation of playing an older game that user may enjoy playing again, despite having played it previously. In some embodiments, the unplayed game list includes at least one game application present in the game history that the user profile has played for a total time less than a predetermine time duration. For example, the unplayed game list may include any game application in the available game list that is not in the game history or that the user profile has not accessed or played for more than 30 minutes. In such examples, the method 750 allows for the recommendation of playing a game application that matches the user profile that user may enjoy with sufficient playtime, despite the game application being present, in a minimal sense, in the game history.

The method 750 further includes comparing one or more game property tags of a plurality of unplayed games to the tag list of a user profile at 754. The unplayed game list includes a plurality of unplayed games. In some embodiments, at least some of the unplayed games of the plurality of unplayed games have game property tags associated therewith that describe or reflect the gameplay, genre, art style, game modes, theme, or other game properties. In some examples, at least some of the game property tags may be predetermined by an operator of the video game platform, a developer, or a publisher. In other examples, at least some of the game property tags may be community generated. In a specific example, a game application in which a threshold percentage of users complete 100% of the achievements or trophies (associated with a "Completionist" tag recorded to a user profile) has the "Completionist" tag added to the game property tags for the game application. This game property tag indicates that the game application is of particular interest to users that enjoy completing 100% of the achievements or trophies. In another specific example, a game application in which a threshold quantity of users complete a minimum quantity of competitive online PvP matches (associated with a "PvP" tag recorded to a user profile) has the "PvP" tag added to the game property tags for the game application. This game property tag indicates that the game application is of particular interest to users that enjoy active PvP communities. The method 750 includes comparing one or more tags of an unplayed game to a tag list of the user profile to determine a degree of match between the one or more tags of the unplayed game and the tag list of the user profile.

In some embodiments, the game property tags are further weighted, similar to the weightings described in relation to FIG. 6. For example, a game application of the fighting game genre is predominantly focused on or dependent on competitive multiplayer. This is in contrast to a game application of the action/adventure genre that is predominantly played in a single player campaign but offers competitive PvP play. While both game applications could have a "PvP" game property tag associated therewith, the game application of the fighting game genre may have a higher weighting to the "PvP" tag than the game application of the action/adventure game genre to more accurately reflect the relative portion of the user's experience that is focused on PvP in each game application.

In some embodiments, the method 750 further includes ranking at least a portion of the plurality of unplayed games based at least partially on the tag list at 756. In some embodiments, ranking at least a portion of the plurality of unplayed games includes calculating a percentage match of the tag list to the game property tags of the individual unplayed games of the plurality of unplayed games. For example, a tag list of a user profile that includes all of the game properties tags of the unplayed game application may be a 100% match. In another example, a tag list of a user profile that includes all of the game properties tags of the unplayed game application and no tags that are not present in the game properties tags may be a 100% match. In yet another example, a tag list of a user profile that includes all of the game properties tags of the unplayed game application with equal weighting of each tag may be a 100% match. In such an example, a tag list of a user profile that includes the game properties tags of the unplayed game application with different weighting may produce less than a 100% match.

In some embodiments, ranking at least a portion of the plurality of unplayed games includes clustering unplayed games into tiers from which the user may select an unplayed game. For example, a first tier may include unplayed game applications that have a 75% or higher match between the tag list of the user profile and the game property tags of the unplayed game application, and a second tier may include unplayed game applications that have between a 50% match and a 75% match between the tag list of the user profile and the game property tags of the unplayed game application. The first tier indicates a high degree of commonality between the tag list of the user profile and the game property tags of the game application, while the second tier indicates a lower degree of commonality between the tag list of the user profile and the game property tags of the game application.

In another example, a first tier may include unplayed game applications that have a 75% or higher match between the tag list of the user profile and the game property tags of the unplayed game application, and a second tier may include unplayed game applications that have a 75% of higher match between the tag list of the user profile and the game property tags of the unplayed game application, but at least one tag or category of tags is mismatched between the tag list and the game properties. For example, a user profile may have a tag list including "PvP", "Fast-paced", "Fantasy", "Teammate", and "Melee", whereas the game property tags include "PvP", "Fast-paced", "Sci-Fi", "Teammate", and "Melee". The first tier indicates a high degree of commonality between the tag list of the user profile and the game property tags of the game application, while the second tier indicates a high degree of commonality between the tag list of the user profile and the game property tags of the game application while offering the user a different type of game to try.

A user may not always want his or her next gameplay experience to be exactly the same as previous gameplay experiences, and different tiers can allow users to quickly visualize options. The method 750 includes presenting to the user a recommended game based at least partially on a ranked plurality of unplayed games at 758. In some embodiments, presenting a recommended game includes presenting a graphical user interface (GUI) to the user including a representation of an unplayed game application. In some examples, the GUI includes a ranking indicator. The ranking indicator may communicate to the user the percentage match between a tag list of the user profile and the game property tags of the unplayed game application. The ranking indicator may communicate a tier of match, such as "A", "B", "C", etc. The ranking indicator may include a description of the relationship between the tag list of the user profile and the game property tags of the unplayed game application, such as "close match to your preferences" or "similar to your preferences, but Sci-Fi."

In some embodiments, presenting to the user a recommended game based at least partially on a ranked plurality of unplayed games includes providing a link to a cloud-based copy of the game application to allow the user to quickly try or experience the game without needing to wait for a download of the game application to the client device. In some embodiments, presenting to the user a recommended game based at least partially on a ranked plurality of unplayed games includes downloading at least a portion of the recommended game to the client device automatically to allow the user to quickly try or experience the game without needing to initialize the download and wait for the download of the game application to the client device. In some examples, a game application can execute a portion of the game, such as a tutorial, without a complete download of the game application. The method 750 may include downloading a portion of the game application needed to allow the user to experience the game application automatically. In some embodiments, presenting to the user a recommended game based at least partially on a ranked plurality of unplayed games includes downloading at least a portion of the highest ranked match between the tag list and the game property tags of the plurality of game applications.

Figure 8:
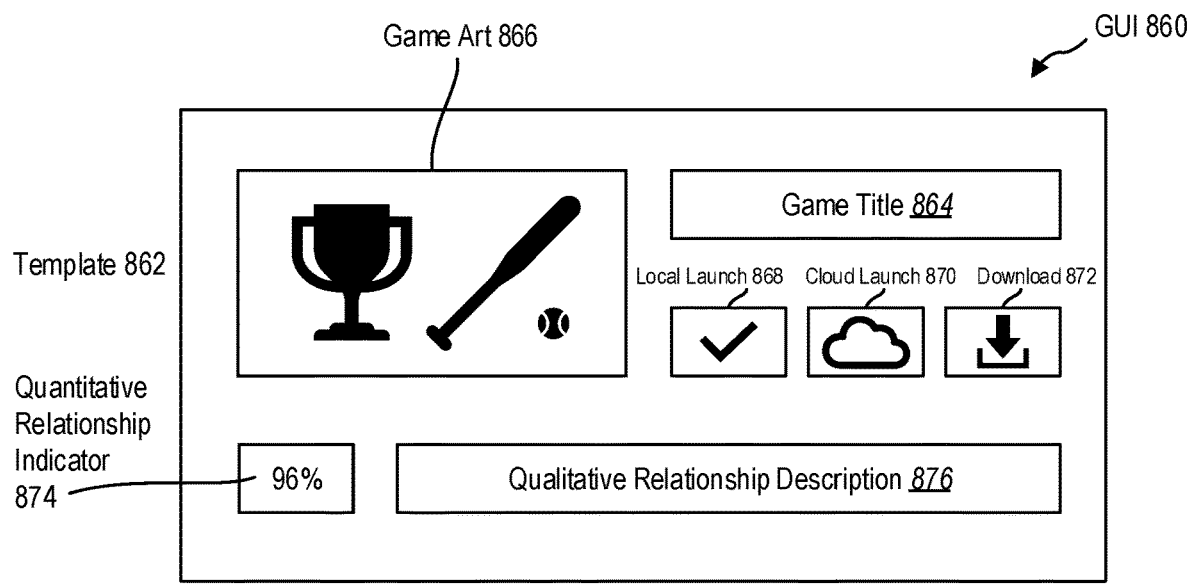
FIG. 8 is a representation of a graphical user interface (GUI) for presenting a recommended unplayed game to a user, according to at least some embodiments of the present disclosure.

FIG. 8 is a representation of a GUI 860 that presents recommended games from the unplayed game list based at least partially on a ranked plurality of unplayed games, such as described in relation to FIG. 7. In some embodiments, a client device displays to a user a recommended game template 862 with a plurality of fields. The client device receives populating information from the recommendation engine to display recommended game applications to the user. For example, the recommended game template 862 may include a highest rank recommended game application within the ranked plurality of unplayed games. In other examples, the recommended game template 862 may include a plurality of the highest ranked recommended game application. In yet other examples, the recommended game template 862 may further include highest rank recommended game application and at least one unplayed game application above a minimum recommendation threshold percentage match but having at least one game property tag not shared with the tag list of the user profile. For example, the recommended game template 862 may include the highest ranked match in a plurality of different genres based at least partially on the ranked plurality of unplayed games.

In some embodiments, the recommended game template 862 includes a game title 864 and game art 866. The recommended game template 862 presents one or more options for launching or preparing to launch the recommended game, such as a local launch input 868, if the client device has downloaded the recommended game application to a local hardware storage device, a cloud launch input 870, if cloud-based gaming is available for the recommended game application, or a download input 872 to initialize a download of the recommended game application to the client device.

To assist the user in choosing a recommended game application, the recommended game template 862 includes, in some embodiments, a quantitative relationship indicator 874 and/or a qualitative relationship indicator 876. The quantitative relationship indicator 874 may communicate the quantitative relationship or match between the tag list of the user profile and the game property tags of the recommended game. For example, the quantitative relationship indicator 874 may be a numerical representation of the percentage match between the tag list of the user profile and the game property tags of the recommended game. The qualitative relationship indicator 876 may communicate the qualitative relationship or match between the tag list of the user profile and the game property tags of the recommended game. For example, the qualitative relationship indicator 876 may describe to the user how the recommended game matches, or does not match, the tag list of the user profile. In at least one example, the qualitative relationship indicator 876 may indicate that the recommended game is "The highest match to the tag list of the user profile within the sports game genre" or similar qualitative description.

Figure 9:
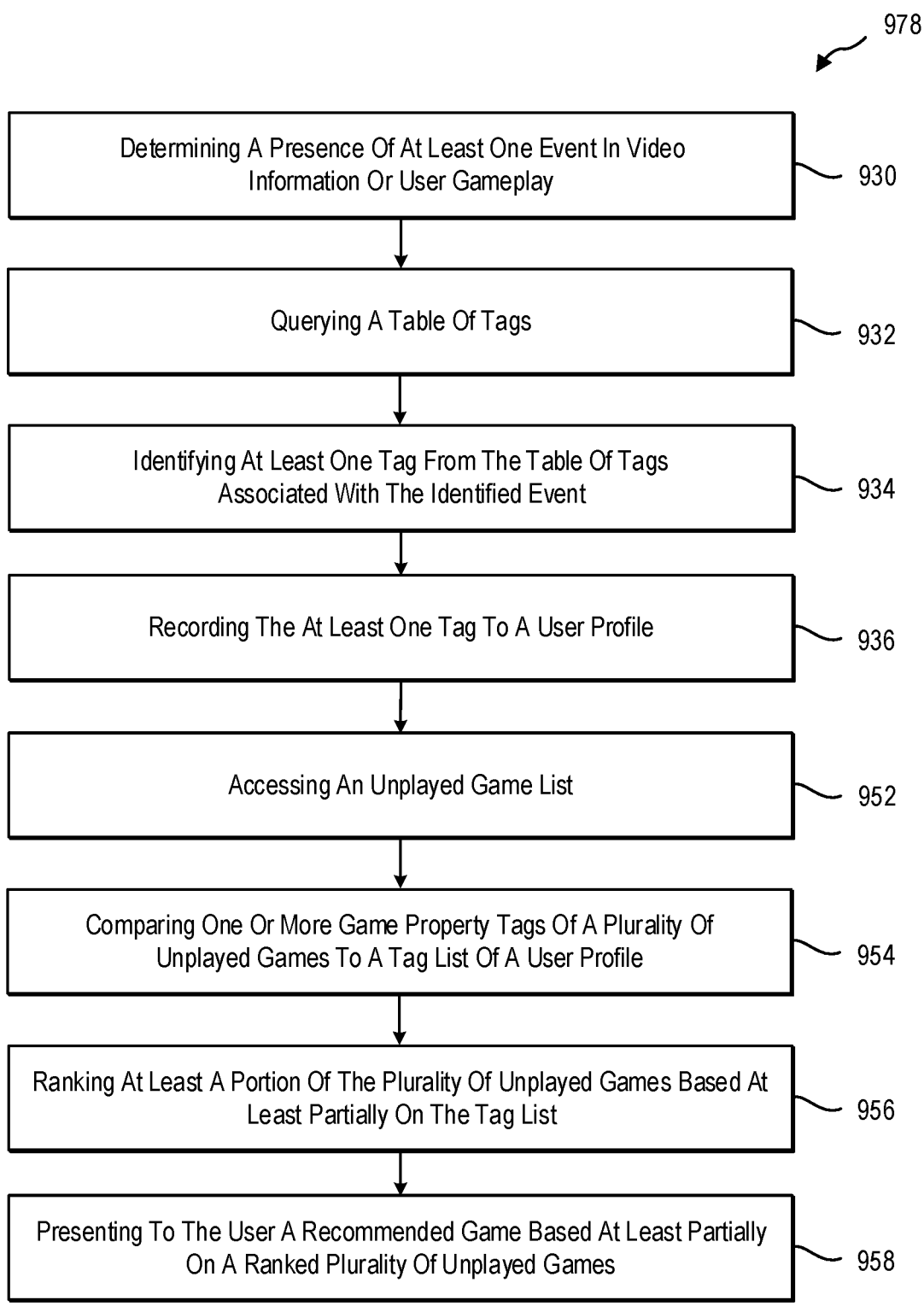
FIG. 9 is a flowchart of another method of recommending unplayed games to a user, according to at least some embodiments of the present disclosure.

In some embodiments, the recommendation engine (whether executed on the client device, a server computer, or other computing device in data communication with the client device and/or server computer) may continuously or periodically update the tag list of the user profile and the ranked plurality of unplayed games. A method 978, illustrated in FIG. 9, of recommending an unplayed game to a user includes, in some embodiments, identifying events in video information from a game application, using the identified events to populate a tag list of a user profile, and using the tag list to ranked unplayed games for presentation to the user.

In some embodiments, the method 978 can use any source of video information from a game application, such as gameplay recordings, recreated renderings of a gameplay session based on game state data, or from live streams of the gameplay. For example, obtaining the video information may include obtaining the video information in real-time as the video information is generated by the processor(s) of the client device (e.g., during live streaming of gameplay). In some examples, obtaining the video information includes accessing a recording of the gameplay that was generated by the processor(s) of the client device after the fact, such as from archived gameplay recordings and/or game state data posted on a social media platform.

The method 978 includes evaluating at least one frame of the plurality of frames of the video information at to identify a virtual object, texture, model, or animation. After identifying the virtual object, texture, model, or animation in the frame, the method includes determining a presence of at least one event associated with the detected element at 930.

In some embodiments, the determining the presence of at least one event in the video information includes comparing the detected object, texture, model, or animation to one or more events of an application module. As described herein, the application module may be predetermined or may be generated by a ML, system. In some embodiments, the application module includes key events, popular events, rare events, any other types of events, or combinations thereof.

While some embodiments of systems and methods for identifying and/or tagging events a user evaluate only video information, some embodiments evaluate other forms of information or data to supplement the video information. In some embodiments, the gameplay obtained further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment.

In some embodiments, the video information includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

In some embodiments, the at least one event is a completion of an achievement or trophy. For example, the completion of an achievement or trophy may be communicated to a server computer via a network communication and/or recorded as shell-level or OS-level of the client device. The recommendation engine may detect the completion of an achievement or trophy as at least one event in the user gameplay.

The video information and/or events identified may be associated with a tag or a category of tags in the application module and/or in the recommendation engine. The method 978 further includes querying a table of tags at 932 and identifying a tag associated with the identified event at 934.

For example, in a first game application, an identified event in related to healing a co-operative teammate in an MMORPG may be associated with a "co-operative" tag or "team player" tag. In another game application, providing an assist to a teammate in a sports game application may be associated with the same tags, despite the actual event being different. The aggregation of multiple iterations of a tag within a user profile can increase the influence that tag has on the user profile.

The method 978 includes recording the identified tag to a user profile at 936. In some examples, the tag is recorded in the user profile independent of the game application being played. In some examples, a plurality of tags are recorded for a single identified event. The aggregation of multiple iterations of a tag within a user profile can increase the influence that tag has on the user profile.

In some embodiments, the method 978 further includes accessing an unplayed game list at 952. In some embodiments, accessing the unplayed game list includes comparing a game history of a user profile to an available game list. For example, the user profile may be associated with a video game platform, such as a video game distribution platform, a video game multiplayer platform, a video game social platform, or another online video game platform that allows users to communicate with the video game platform to access available game applications or portions of game applications. In a specific example, a video game distribution platform includes a library of game applications that are available for download to a client device, and the downloaded game application is executable on the client device. In another example, a video game distribution platform is a cloud-based video game platform that allows a client device to access and interact with game applications stored and executed on a remote server. In some embodiments, the unplayed game list includes game applications available for download to a client device and/or available for cloud-based access and interaction.

The unplayed game list includes at least one game application that is present in the available game list and not present in the game history of the user profile. In some embodiments, the unplayed game list includes at least one game application present in the game history that the user profile has not accessed or played within a predetermined time period. In one example, the unplayed game list may include any game application in the available game list that is not in the game history or that the user profile has not accessed or played within 3 years. In such examples, the method 978 allows for the recommendation of playing an older game that user may enjoy playing again, despite having played it previously. In some embodiments, the unplayed game list includes at least one game application present in the game history that the user profile has played for a total time less than a predetermine time duration. For example, the unplayed game list may include any game application in the available game list that is not in the game history or that the user profile has not accessed or played for more than 30 minutes. In such examples, the method 978 allows for the recommendation of playing a game application that matches the user profile that user may enjoy with sufficient playtime, despite the game application being present, in a minimal sense, in the game history.

The method 978 further includes comparing one or more game property tags of a plurality of unplayed games to the tag list of a user profile at 954. The unplayed game list includes a plurality of unplayed games. In some embodiments, at least some of the unplayed games of the plurality of unplayed games have game property tags associated therewith that describe or reflect the gameplay, genre, art style, game modes, theme, or other game properties. In some examples, at least some of the game property tags may be predetermined by an operator of the video game platform, a developer, or a publisher. In other examples, at least some of the game property tags may be community generated. In a specific example, a game application in which a threshold percentage of users complete 100% of the achievements or trophies (associated with a "Completionist" tag recorded to a user profile) has the "Completionist" tag added to the game property tags for the game application. This game property tag indicates that the game application is of particular interest to users that enjoy completing 100% of the achievements or trophies. In another specific example, a game application in which a threshold quantity of users complete a minimum quantity of competitive online PvP matches (associated with a "PvP" tag recorded to a user profile) has the "PvP" tag added to the game property tags for the game application. This game property tag indicates that the game application is of particular interest to users that enjoy active PvP communities. The method 978 includes comparing one or more tags of an unplayed game to a tag list of the user profile to determine a degree of match between the one or more tags of the unplayed game and the tag list of the user profile.

In some embodiments, the game property tags are further weighted. For example, a game application of the fighting game genre is predominantly focused on or dependent on competitive multiplayer. This is in contrast to a game application of the action/adventure genre that is predominantly played in a single player campaign but offers competitive PvP play. While both game applications could have a "PvP" game property tag associated therewith, the game application of the fighting game genre may have a higher weighting to the "PvP" tag than the game application of the action/adventure game genre to more accurately reflect the relative portion of the user's experience that is focused on PvP in each game application.

In some embodiments, the method 978 further includes ranking at least a portion of the plurality of unplayed games based at least partially on the tag list at 956. In some embodiments, ranking at least a portion of the plurality of unplayed games includes calculating a percentage match of the tag list to the game property tags of the individual unplayed games of the plurality of unplayed games. For example, a tag list of a user profile that includes all of the game properties tags of the unplayed game application may be a 100% match. In another example, a tag list of a user profile that includes all of the game properties tags of the unplayed game application and no tags that are not present in the game properties tags may be a 100% match. In yet another example, a tag list of a user profile that includes all of the game properties tags of the unplayed game application with equal weighting of each tag may be a 100% match. In such an example, a tag list of a user profile that includes the game properties tags of the unplayed game application with different weighting may produce less than a 100% match.

In some embodiments, ranking at least a portion of the plurality of unplayed games includes clustering unplayed games into tiers from which the user may select an unplayed game. For example, a first tier may include unplayed game applications that have a 75% or higher match between the tag list of the user profile and the game property tags of the unplayed game application, and a second tier may include unplayed game applications that have between a 50% match and a 75% match between the tag list of the user profile and the game property tags of the unplayed game application.

The first tier indicates a high degree of commonality between the tag list of the user profile and the game property tags of the game application, while the second tier indicates a lower degree of commonality between the tag list of the user profile and the game property tags of the game application.

In another example, a first tier may include unplayed game applications that have a 75% or higher match between the tag list of the user profile and the game property tags of the unplayed game application, and a second tier may include unplayed game applications that have a 75% of higher match between the tag list of the user profile and the game property tags of the unplayed game application, but at least one tag or category of tags is mismatched between the tag list and the game properties. For example, a user profile may have a tag list including "PvP", "Fast-paced", "Fantasy", "Teammate", and "Melee", whereas the game property tags include "PvP", "Fast-paced", "Sci-Fi", "Teammate", and "Melee". The first tier indicates a high degree of commonality between the tag list of the user profile and the game property tags of the game application, while the second tier indicates a high degree of commonality between the tag list of the user profile and the game property tags of the game application while offering the user a different type of game to try.

A user may not always want his or her next gameplay experience to be exactly the same as previous gameplay experiences, and different tiers can allow users to quickly visualize options. The method 978 includes presenting to the user a recommended game based at least partially on a ranked plurality of unplayed games at 958. In some embodiments, presenting a recommended game includes presenting a graphical user interface (GUI) to the user including a representation of an unplayed game application. In some examples, the GUI includes a ranking indicator. The ranking indicator may communicate to the user the percentage match between a tag list of the user profile and the game property tags of the unplayed game application. The ranking indicator may communicate a tier of match, such as "A", "B", "C", etc. The ranking indicator may include a description of the relationship between the tag list of the user profile and the game property tags of the unplayed game application, such as "close match to your preferences" or "similar to your preferences, but Sci-Fi."

In some embodiments, presenting to the user a recommended game based at least partially on a ranked plurality of unplayed games includes providing a link to a cloud-based copy of the game application to allow the user to quickly try or experience the game without needing to wait for a download of the game application to the client device. In some embodiments, presenting to the user a recommended game based at least partially on a ranked plurality of unplayed games includes downloading at least a portion of the recommended game to the client device automatically to allow the user to quickly try or experience the game without needing to initialize the download and wait for the download of the game application to the client device. In some examples, a game application can execute a portion of the game, such as a tutorial, without a complete download of the game application. The method 978 may include downloading a portion of the game application needed to allow the user to experience the game application automatically. In some embodiments, presenting to the user a recommended game based at least partially on a ranked plurality of unplayed games includes downloading at least a portion of the highest ranked match between the tag list and the game property tags of the plurality of game applications.

In at least some embodiments, system and methods according to the present disclosure can allow more relevant recommendations to users based on, not only the game applications the user tries or plays, but the choices, experiences, preferences, and selections made during the time the user spends interacting with game applications.

INDUSTRIAL APPLICABILITY

The present disclosure generally relates to systems and methods for recommending video games to a user. More particularly, the present disclosure relates to providing a more complete recommendation to a user for new gameplay experiences based at least partially on the user's gameplay preferences and styles measured during gameplay of one or more game applications. In some embodiments, the choices made during gameplay by a user are detected and/or measured to populate a user profile with experience properties in addition to or alternative to a conventional list of games played by the user.

For example, a recommendation engine accesses a plurality of tags associated with a user profile. The plurality of tags are representative of a plurality of choices and experiences that have occurred during the use of the user account to play one or more video games. For example, a tag may be associated with a game application, itself, wherein the user profile includes tags related to the genre, publisher, developer, platform, or date of publication of a game application. In other examples, a tag is associated with one or more modes of gameplay selected by the user account (on behalf of the user) while playing a game application. In a particular example, a tag is associated with certain multiplayer modes of a game application, indicating the user's preference for that game mode. In another example, a tag is associated with certain decisions made during gameplay, such as narrative decisions in a game application that may alter the user's experience or an ending of the game application story.

By aggregating the tags in the user profile, a plurality of tags can inform the recommendation engine of the user's gameplay preferences based upon a single game. For example, conventional recommendation systems associate a game application or other product with one or more tags that are describe the game application, such as genre. However, a game application is an interactive form of media, allowing the user greater degree of freedom to enjoy and engage with the game application in a variety of manners than other forms or media. In an example, a user may choose to only or predominantly play the multiplayer mode(s) of a game and not play the single player or "campaign" mode of the game application. In another example, a user may choose to only or predominantly play the single player or "campaign" mode of the game application while avoiding or "bouncing off" the multiplayer mode(s) after trying the multiplayer mode(s) once or infrequently and not returning to the multiplayer mode(s). In a conventional recommendation system, the user may be presented with games that share characteristics with the portions of the game application that the user did not enjoy or with which the user did not spend significant time engaged.

In some embodiments, a recommendation engine according to the present disclosure detects, collects, records, aggregates, and combinations thereof the events and behaviors of the user during the gameplay of one or more game applications to provide a more complete representation of the user's preferences and gameplay in the user profile. While examples and embodiments will be described herein that relate to user profiles includes tags from a single game and to tags from multiple games, it should be understood that systems and methods according to the present disclosure may provide improved recommendations to the user based on playing a portion of a single game, completing multiple games, or any amount or type of gameplay therebetween.

In some embodiments, a recommendation engine includes a fixed set of tags that represent a plurality of categories of gameplay across a variety of game applications. For example, a tag (e.g., "Player versus Player" or "PvP") associated with competitive multiplayer may be associated with a plurality of game applications that offer PvP multiplayer modes. In other examples, a tag (e.g., "Completionist") associated with unlocking at least a threshold percentage or all of the achievements or trophies associated with a game application may be associated with all game applications that offer achievements or trophies on a video game platform. In some embodiments, a recommendation engine includes a dynamic set of tags that are at least partially based on community engagement and/or behavior, as will be described in more detail herein.

In some embodiments, the video game platform hosted on one or more server computers includes the recommendation engine. In some embodiments, the recommendation engine resides locally on a local computing device of the user (such as a general-purpose computing device used to play a game application, or a specialized computing device such as a video game console). In some embodiments, the recommendation engine is hosted and executed independently from the server computers providing the video game platform or from the local computing device executing the game application. For example, the local computing device and the server computer(s) of the video game platform are in data communication via a network, and the recommendation engine is further in data communication with the local computing device and the server computer(s) of the video game platform via the network. The recommendation engine can receive data from the local computing device and/or the server computer(s) of the video game platform to receive information from the user profile and/or to create the user profile.

The user profile is, in some embodiments, part of the recommendation engine. For example, the recommendation engine may detect, receive, obtain, aggregate, or combinations thereof information related to the user gameplay to create a user profile stored in the recommendation engine for the user. In other embodiments, the recommendation engine obtains information from a user profile that is stored locally on the local computing device used to execute the game application(s). In other embodiments, the recommendation engine obtains information from a user profile that is stored remotely from the local computing device on one or more server computers.

In some embodiments, a fixed set of tags are determined by the operator of the video game platform. For example, the user profile may be associated with a particular video game platform from which the game application is purchased, rented, downloaded, or on which the game application is played, either in single player or multiplayer modes. The operator of the video game platform may determine the tags to provide a uniform set of tags that are recognizable and interoperable between game applications on the video game platform.

The operator of the video game platform may associate or assign a tag from the fixed set of tags to one or more events, modes, or other aspects of the game application. An operator of the video game platform commonly approves a game application for distribution and/or play on the video game platform. In some embodiments, the operator of the video game platform associates or assigns a tag to an event, mode, or other aspect of the game application during the review and approval process. In other embodiments, a publisher or a developer of the game application associates or assigns a tag from the fixed set of tags provided by operator of the video game platform. In doing so, the publisher or developer can select the aspects of the game application considered most integral to the user's experience and engagement with the game application to associate with tags.

In at least some embodiments, one or more tags may be automatically associated and/or assigned based on event detection. For example, a tag of the fixed set of tags may be related to a round victory or a victory over a campaign boss character. While the video game platform may provide achievements, individual round victories or a victories over a campaign boss character may not be tracked or recognized by the achievements previously associated with the game application. Event detection through object detection, animation detection, or optical character recognition (OCR) may allow for the detection and recording of events and tags not assigned at the publication of the game. Additionally, event detection may allow for similar events across a plurality of game applications to be identified with similar tags to provide consistent tracking and aggregation of user preferences and experiences across multiple game applications. In at least some embodiments, the event detection is at least partially performed by a machine learning (ML) model.

At least some tags may be community created. For example, many video game communities capture, share, and engage with screen captures and/or recordings of gameplay on various social media platforms. In some embodiments, a recommendation engine may obtain comparison videos from a social media platform and identify events within the comparison videos that are popular amongst the community of the game application or similar game applications. The recommendation engine may create additional tags or associate one or more existing tags of the fixed sets of tags with the events that are identified in comparison videos from social media. In at least one example, an event in a game application may be unassociated with a tag from the developer, publisher, or operator of the video game platform, but may develop a significance within the community. A recommendation engine may identify such events and associate a tag with those events that allows the recommendation of games with similar popular or viral events within gameplay.

In some embodiments, a system for surfacing electronic gaming video information to a user includes a client device and a server computer in communication via a data network. The system includes a client device and a server computer in communication via a data network. In some embodiments, the client device is a computing device with a processor and hardware storage device in communication with the processor. In some embodiments, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device is local to and/or integrated with the client device. In some embodiments, the hardware storage device is accessed by the client device through a network connection.

The processor may execute a game application that is stored on the hardware storage device to render video information at least partially in response to user inputs to the client device. In some embodiments, the client device 102 includes a display device to display the video information to a playing user. For example, the client device may be a dedicated gaming console with an integrated display (e.g., NINTENDO SWITCH) or a general-purpose computer with an integrated display (e.g., a laptop computer). In some embodiments, the client device is in communication with a display device to display the video information to a playing user. For example, the client device may be a gaming console (e.g., MICROSOFT XBOX) that outputs the video information to a connected display device (e.g., a television) for display to a playing user.

In some embodiments, the video information or a portion of the video information is also transmitted to a server computer via a data network. In some embodiments, the server computer is located remotely from the client device 102 and the data network is or includes the World Wide Web. For example, the client device may be connected to the data network via the playing user's home internet connection, and the server computer may be located in a datacenter. In some embodiments, the server computer is located locally to the client device and the video information is transmitted over a local area network or a direct data connection. For example, a competitive electronic game tournament (e.g., an eSports competition) may have a local data network to which all client devices used for the competition are connected. A server computer connected to the local data network may communicate with the client devices used for the competition.

In some embodiments, the server computer receives the video information from the client device via the data network. The server computer 104 includes a processor and a hardware storage device in data communication with the processor. The hardware storage device has instructions stored thereon that, when executed by the processor, cause the server computer to perform any of the methods described herein. For example, the server computer may detect events in the video information to classify different events and/or objects based on identified textures, models, animations, or other criteria.

In at least one embodiment, the server computer includes or is in communication with an ML model that detects and/or reports events in the video information or related to the user gameplay to identify and tag events. In some embodiments, the server computer has stored thereon (e.g., in the hardware storage device) an ML model that accesses and/or communicates with ML model data. In some examples, the ML model data is stored locally to the server computer. In some examples, the ML model data is stored remotely from the server computer and accessed by the server computer via the data network. For example, the ML model data may be aggregated from and/or refined by a plurality of ML models executed by a plurality of server computers. The ML model data may be updated based on the outputs of the ML models, with the most current ML model data made available for the ML model running on the server computer when needed.

The recommendation engine is, in some embodiments, in data communication with the network to communicate with the client device, the server computer, and/or the ML model data. The recommendation engine, as described herein, may be stored on and/or executed on the server computer, the client device, another remote computer, or combinations thereof.

As illustrated in the foregoing discussion, the present disclosure utilizes a variety of terms to describe features and advantages of the ML model. Additional detail is now provided regarding the meaning of such terms. For example, as used herein, an "ML model" refers to a computer algorithm or model (e.g., a classification model, a regression model, a language model, an object detection model) that can be tuned (e.g., trained) based on training input to approximate unknown functions. For example, a ML model may refer to a neural network or other ML algorithm or architecture that learns and approximates complex functions and generate outputs based on a plurality of inputs provided to the ML model.

In some embodiments, a ML system, model, or neural network described herein is an artificial neural network. In some embodiments, a ML system, model, or neural network described herein is a convolutional neural network. In some embodiments, a ML system, model, or neural network described herein is a recurrent neural network. In at least one embodiment, a ML system, model, or neural network described herein is a Bayes classifier. As used herein, a "ML system" may refer to one or multiple ML models that cooperatively generate one or more outputs based on corresponding inputs. For example, a ML system may refer to any system architecture having multiple discrete machine learning components that consider different kinds of information or inputs.

As used herein, an "instance" refers to an input object that may be provided as an input to a ML system to use in generating an output, such as events within video information. For example, an instance may refer to any virtual object provided in the user interface (UI) of the video information. For example, a UI may present notifications to a user in response to certain events. The ML system may perform one or more machine vision techniques to evaluate the video information for associated events when the UI notification is present. The ML system may refine over iterations to "learn" when visual events are correlated with the UI notification. For example, a UI element indicating player avatar health may increase in value in response to the player avatar interacting with a health pack in the game environment.

In some embodiments, the ML system can create an application module of expected or correlated events in the video information. In a particular example, if the UI element indicates that the playing user has performed an opponent elimination, other aspects of the video information may be detected and/or identified to associate opponent eliminations with the identified animation. In another example, each time a player avatar performs an assist, the ML system may identify to whom the player avatar passed the ball for the goal (such as in sports games). Further, the ML system can create or refine an application module to include commonly queried or associated categories of tags for events. In some examples, all key events may be associate with a match timestamp, while opponent eliminations, specifically, further include tags indicating what weapon the player avatar had equipped at that time. In some examples, a player elimination key event may include tags associated with the name of the opponent that eliminated the player and/or the weapon that was used to eliminate the player. The tags may allow the ML system and/or the recommendation engine to determine a preferred playstyle within a game application. For example, a role-playing game with many options for avatar class or skills may interest different users for different reasons. A user profile may record or aggregate tags that indicate a preferred playstyle (such as a healer in a massively multiplayer online RPG or a mage in a competitive multiplayer online battle arena) that is not otherwise captured in a game history or achievements.

An instance provided to the ML system may further include other digital objects including text, identified objects, or other types of data that may be parsed and/or analyzed using one or more algorithms. In one or more embodiments described herein, an instance is a "training instance," which refers to an instance from a collection of training instances used in training a ML system. Moreover, an "input instance" may refer to any instance used in implementing the machine learning system for its intended purpose. As used herein, a "training dataset" may refer to a collection of training instances. In some embodiments, a training dataset includes a plurality of frames of video information.

In some embodiments, systems and methods described herein obtain a training dataset and identify one or more labels of the instances of the training dataset to detect events based on a comparison of labeled events against an application module. In some embodiments, the application module is predetermined, such as by a developer or publisher of the game application. In some embodiments, the application module is developed and refined by the ML system by iterations of processing video information.

In some embodiments, a frame of video information includes an object (e.g., a tree) positioned in the game environment with the player avatar, in this case a car. Other objects in the frame include the user interface which may be independent of the three-dimensional game environment. The machine vision may identify the position, size, and shape of the tree object relative to the player avatar to determine relative position of the object and the avatar in the game environment. By evaluating the relative position of the object and the avatar in one frame or a sequence of frames (adjacent frames at the native framerate or non-adjacent key frames), the machine vision and/or ML system may identify a crash between the car and the tree. The crash may be identified as a key event and denoted as such relative to the social media metrics.

In some embodiments, the video information provided by the client device running the game application is associated with game state data. Game state data includes any information that may allow a second electronic device to recreate a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

Because the video information can be associated with the game state data, object identifications (IDs) may be associated with the objects detected in the video information, allowing higher reliability in the object detection. Additionally, the game state data may include object IDs, which can be compared to the detected objects to refine a ML system of the machine vision and improve the object detection of the system.

In some embodiments, machine vision and/or object detection can measure relative motion of edges to determine the position of virtual objects. For example, a detected object that does not change position within the frames across a plurality of frames of the video information while the avatar moves and/or the user's perspective relative to the game environment moves may be an element of the UI. In other examples, a detected object that increases in size differently than the other objects in the game environment may be moving relative to the game environment. In some embodiments, a crash key event may be identified by a change in the UI depicting the speedometer rapidly and/or suddenly decreasing in value. For example, a rapid change in the UI reflecting a change in speed of the car avatar from 150 kilometers per hour (kph) to 0 kph in under 1.0 seconds may be identified as a crash.

A virtual object, as used herein, may include any object or element rendered or presented by the client device in the process of running the game application. For example, a virtual object may be an element of the UI. In some examples, a virtual object may be a player avatar. In some examples, the virtual object may be wall, floor, or other geometry of the game environment such as a tree object. In some examples, the virtual object may be an interactive or movable object within the game environment, such as a door, crate, or power-up.

In some embodiments, the machine vision and/or ML model can identify objects in the game environment without explicit training to identify the object. For example, a machine vision system that includes ML may learn to identify tree objects within the game environment, even if the particular model of tree object has not been explicitly taught to the machine vision system. In at least one example, systems and methods according to the present disclosure may be portable between video information from a variety of game applications where different models for common objects, such as the tree object, are used. By training the ML model, the machine vision may be able to recognize and detect a tree object in the video information. In some examples, elements of the game environment are procedurally generated. A series of procedurally generated tree objects may include common elements but be distinct models from one another, as rendered in the video information. Therefore, an explicitly provided model would be inapplicable to procedurally generated tree objects.

In some embodiments, the machine vision system invokes an application module that is associated with the game application that is the source of the video information. Art styles can vary considerably between game applications. Even a ML model that has been trained on video information from a plurality of game applications to detect tree objects may fail when presented with a new art style. For example, while both FORNITE and CALL OF DUTY are competitive first-person shooter games, the appearance of objects is different between the games. Specifically, tree objects and other elements of the game environment appear different between the two game applications.

Systems and methods according to the present disclosure may access an application module that is associated with the game application that is the source of the video information. The application module may be generated by the ML model based on the game engine, may include predetermined or user-defined events, or combinations of both.

As described herein, the ML model data may be stored remotely to the client device and/or the server computer and be accessed by the server computer as needed based on the video information or other information provided by the client device. In at least one embodiment, the ML model data is part of an application module including game application-specific information for machine vision and/or event identification and classification.

In some embodiments, social media metrics of a comparison video(s) obtained from a social media platform (e.g., "likes", shares, comments, views, saves, or other social media metrics) may be reported to the ML model and/or ML model data to further refine the ML model based on other user's reactions to the events and/or the associated tags. For example, a clip published to social media showing an elimination performed at very low resource levels in a multiplayer online battle arena (MOBA) game may spur greater social engagement than a single elimination performed with high resource levels. The ML model may, therefore, refine and train over time to identify and/or highlight events which are correlated to high levels of social engagement on social media.

The ML model may allow for identification of objects and/or events with tags associated therewith. The object detection may include any of the methods or techniques described herein to identify the virtual objects in the video information. In some embodiments, the method includes determining the presence of a key event, a popular event, a rare event, or any other type of event based on the present of the object, texture, model, or animation. In some embodiments, determining the presence of an event includes evaluating a change in the virtual object, texture, model, or animation between frames of the plurality of frames. In some embodiments, compared frames are adjacent frames in the native framerate of the rendered game environment. For example, the video information may include 60 frames per second as the client device renders the game environment at 60 frames per second. The compared frames may be adjacent frames in the native 60 frames per second with a delta of approximately 16.67 milliseconds between frames. In some embodiments, the compared frames are key frames or other non-adjacent frames in the native framerate. For example, the video information may include 60 frames per second as the client device renders the game environment at 60 frames per second, but the compared frames are selected 0.25 seconds apart from one another or approximately 15 frames apart.

The changes to the virtual object between the first frame and the second frame may be calculated based on changes relative to the game environment, or changes based on expected correlations. Some changes in the virtual object relative to the game environment may include the appearance or disappearance of the virtual object in the game environment. The comparison of frames may include the detection of a particular animation of an avatar model or other model. A comparison of frames may include the detection of change in textures skinning a model, which may be associated with an event such as receiving damage or acquiring a new piece of equipment in the game.

In some embodiments, a method of identifying events in video information from a video game performed at a server computer or a client device. In at least one example, the client device presents to a user video information that is rendered at a remote computer, such as during cloud-based gaming. In some embodiments, the method can be performed on any source of video information from a game application, such as gameplay recordings, recreated renderings of a gameplay session based on game state data, or from live streams of the gameplay. For example, obtaining the video information may include obtaining the video information in real-time as the video information is generated by the processor(s) of the client device (e.g., during live streaming of gameplay). In some examples, obtaining the video information includes accessing a recording of the gameplay that was generated by the processor(s) of the client device after the fact, such as from archived gameplay recordings and/or game state data posted on a social media platform.

The method includes evaluating at least one frame of the plurality of frames of the video information at to identify a virtual object, texture, model, or animation. After identifying the virtual object, texture, model, or animation in the frame, the method includes determining a presence of at least one event associated with the detected element.

In some embodiments, the determining the presence of at least one event in the video information includes comparing the detected object, texture, model, or animation to one or more events of an application module. As described herein, the application module may be predetermined or may be generated by a ML system. In some embodiments, the application module includes key events, popular events, rare events, any other types of events, or combinations thereof.

In at least one embodiment, key events are events that progress a gameplay session toward a resolution or definitive outcome. In some embodiments, key events may be predetermined in the application module specifically for the game application being played. Key events for an American football game application may include a touchdown, field goal, fumble, fumble recovery, sack, interception, punt, kickoff, halftime, or full time. Key events for a first-person shooter (FPS) game application may include an opponent elimination, a player elimination, a health pickup, a shield pickup, a reload, a multi-elimination, a round victory, a teammate elimination, a flag pickup, or a point capture. Key events for a MOBA game application may include an opponent elimination, a player elimination, a health pickup, a shield pickup, an ability usage, a cooldown expiration, a multi-elimination, a round victory, a teammate elimination, player-versus-environment (PvE) elimination; or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interests to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, which are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players. Experience of rare events may be associated with a specific type of player interested in exploring the details of the game environment or game application, and tags associated with rare events can assist in providing relevant information in the user profile.

In some embodiments, the application module includes probability tables that allow the detection of rare events in the video information. For example, drop tables for a role-playing game may control the probability that a game engine provides a particular item to the player avatar in the game environment. If an item has a drop rate of 5.0%, a single detection of the item in the video information is, while uncommon by design, non-anomalous. However, if the method or system described herein detects the item dropping 5 out of 20 chances (a 0.000000147% chance), the sequence may indicate a rare event of interest. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate rare event of interest. The application module may include threshold values to determine when a series of probable events becomes sufficiently rare to be designated a rare event. In some embodiments, a probability curve may be calculated based on the drop table or other probability table, and a threshold may be set at a standard deviation away from a most likely outcome. In another embodiment, the threshold may be set manually, such that a detected rare event or sequence of events is reported when the occurrence exceeds the manually set threshold.

While some embodiments of systems and methods for identifying and/or tagging events a user evaluate only video information, some embodiments evaluate other forms of information or data to supplement the video information. In some embodiments, the gameplay obtained further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment.

In some embodiments, the video information includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

The video information and events identified therein may be associated with a tag or a category of tags in the application module and/or in the recommendation engine. The method further includes querying a table of tags and identifying a tag associated with the identified event. For example, in a first game application, an identified event in related to healing a co-operative teammate in an MMORPG may be associated with a "co-operative" tag or "team player" tag. In another game application, providing an assist to a teammate in a sports game application may be associated with the same tags, despite the actual event being different. The aggregation of multiple iterations of a tag within a user profile can increase the influence that tag has on the user profile.

The method includes recording the identified tag to a user profile. In some examples, the tag is recorded in the user profile independent of the game application being played. In some examples, a plurality of tags are recorded for a single identified event. The aggregation of multiple iterations of a tag within a user profile can increase the influence that tag has on the user profile.

In other examples, the recommendation engine detects network communications between a client device and a game server computer, where the network communications indicate user decisions within the game application. FIG. 4 is an embodiment of a system where the client device is in data communication with a server computer via a network. In some examples, the server computer provides information to the client device for at least some portions of the game application executed by the processor from the hardware storage device. For example, the processor may receive network communications from the server computer regarding game state for online multiplayer matches of the game application. A recommendation engine detects the game state communications between the client device and the server computer to identify events or modes within the game application executed by the processor of the client device. In at least one example, the recommendation engine detects a matchmaking request from the client device to the server computer to initiate an online competitive PvP match in the game application. In at least another example, the recommendation engine detects a support request from the game application to allow another user to assist the user (or the client device) in the single player campaign mode of the game application.

In some embodiments, the recommendation engine detects network communications between the client device and the server computer related to achievements or trophy completions. For example, most achievements or trophy completions are stored at a server computer (on the hardware storage device, via the processor) to allow a user to access his or her achievement list (and progress toward achievement completion) from a plurality of network-connected devices. A network communication related to an achievement or trophy is, therefore, communicated to the server computer upon completion of the achievement or trophy at the client device executing the game application. The network communication can inform the recommendation engine of achievements and/or trophies, for which the recommendation engine can query a table of tags and record one or more tags to the user profile.

In some embodiments, the network communications between the client device and the server computer further include game statistics, such as total time played, time played in multiplayer, total quantity of matches played, total number of eliminations, total number of heals, in-game ranking, PVP ranking, etc. In some embodiments, the game statistics are related to a game profile that the user may share between platforms. For example, a competitive online game application may allow cross-platform play with different user accounts associated with a single game profile specific to the game application. In at least one example, a first user account associated with a video game console platform and a second user account associated with a personal computer platform are both associated with (e.g., linked to) a game profile that shares cumulative game statistics between both user accounts used to play the game application. In some examples, the recommendation engine 419 detects network communications related to the cumulative game statistics of the game profile, allowing the recommendation engine to identify and record tags related to cross-platform play.

In some embodiments, a user profile includes a game history with a plurality of game records associated therewith. The game records include one or more events and/or game statistics for each game. For example, the events may include identified events (such as key events) based on the object detection and/or event detection described herein or based on identified achievements or trophies completed while playing using the user profile. The game statistics reflect the cumulative actions or time spent playing the game application with the user profile, and may include game statistics that are tracked by the game application or statistics measured by the user profile (such as total time) or by the ML system or recommendation engine (such as total matches played, eliminations, wins, losses, healing, levels completed, playthroughs completed, etc. that are identified through the object detection and/or event detection described herein).

In some embodiments, a recommendation engine accesses or obtains one or more game records in the user profile to determine tags associated with the game events and/or game statistics. For example, the recommendation engine may query a table of tags for any tags associated with a first event of the first game record. When an associated tag is identified, the recommendation engine then records the associated tag to a tag list. Similarly, the recommendation engine may query a table of tags for any tags associated with a game statistic of the first game record. When an associated tag is identified, the recommendation engine then records the associated tag to a tag list. The recommendation engine may repeat the process for each of the game records.

In some embodiments, the tag list is stored in the user profile, which can reduce and/or eliminate the need for redundant querying and recording of tags. The recommendation engine may record the tags with a quantity or weighting of the respective tags in the tag list. In some embodiments, the relative quantity or weighting of the tag allows the recommendation engine to evaluate the user's preferences and experiences during gameplay to tailor recommendations for new unplayed games. It should be understood that while the recommendations herein are described as being for unplayed games, the recommendation engine may also recommend previously played games that exceed a time period of having been unplayed or a game in the game history that the user "bounced off" and only played for a short period of time. In other words, the recommendation engine may recommend an unplayed game that is new to the user profile or a game that is functionally "unplayed" because the user has not played the game within a sufficiently long time period (e.g., 1 year, 3 years, 5 years, on the current generation of console, etc.) or has not played the game enough.

In some embodiments, the weighting is based at least partially on a number of times the particular tag has been recorded to the tag list from unique events, achievements, game statistics, etc. For example, the "Completionist" tag may be recorded when the user profile is associated with completing 100% of achievements or trophies in a game application. For each game record in a game history that reflects all achievements or trophies have been completed, the recommendation engine may assign an instance of the "Completionist" tag. In another example, the recommendation engine may record an instance of the "Player-v-player" tag each time a competitive matchmaking request network communication is detected and/or each time a competitive PvP round is completed.

In some embodiments, the weighting is a relative weighting between tags. In some examples, the weighting is based at least partially on a duration of time played for the game application (or game record) associated with an instance of the tag. For example, the weighting of the "Spellcaster" tag may reflect the user profile being used to play as a spellcaster-class character in any game application for 140 hours relative to only 7 hours played as a melee-class character in any game application.

In other examples, the weighting is based at least partially on an estimated or calculated time to earn the tag. For example, the "Completionist" tag may be assigned a greater weighting because the "Completionist" tag is related to completing all of the achievements or trophies in a game, which inherently includes completing or experiencing many events that are each associated with other tags. In the prior example, the weighting for the "Spellcaster" tag is based on the number of hours played as that class of character. In some embodiments, each instance of the "Completionist" tag recorded to the tag list may be assigned a weighting of 100, based on the estimated 100 hours required to achieve each instance of the "Completionist" tag.

In some embodiments, a method for recommending an unplayed game to a user includes accessing an unplayed game list. In some embodiments, accessing the unplayed game list includes comparing a game history of a user profile to an available game list. For example, the user profile may be associated with a video game platform, such as a video game distribution platform, a video game multiplayer platform, a video game social platform, or another online video game platform that allows users to communicate with the video game platform to access available game applications or portions of game applications. In a specific example, a video game distribution platform includes a library of game applications that are available for download to a client device, and the downloaded game application is executable on the client device. In another example, a video game distribution platform is a cloud-based video game platform that allows a client device to access and interact with game applications stored and executed on a remote server. In some embodiments, the unplayed game list includes game applications available for download to a client device and/or available for cloud-based access and interaction.

The unplayed game list includes at least one game application that is present in the available game list and not present in the game history of the user profile. In some embodiments, the unplayed game list includes at least one game application present in the game history that the user profile has not accessed or played within a predetermined time period. In one example, the unplayed game list may include any game application in the available game list that is not in the game history or that the user profile has not accessed or played within 3 years. In such examples, the method allows for the recommendation of playing an older game that user may enjoy playing again, despite having played it previously. In some embodiments, the unplayed game list includes at least one game application present in the game history that the user profile has played for a total time less than a predetermine time duration. For example, the unplayed game list may include any game application in the available game list that is not in the game history or that the user profile has not accessed or played for more than 30 minutes. In such examples, the method allows for the recommendation of playing a game application that matches the user profile that user may enjoy with sufficient playtime, despite the game application being present, in a minimal sense, in the game history.

The method further includes comparing one or more game property tags of a plurality of unplayed games to the tag list of a user profile. The unplayed game list includes a plurality of unplayed games. In some embodiments, at least some of the unplayed games of the plurality of unplayed games have game property tags associated therewith that describe or reflect the gameplay, genre, art style, game modes, theme, or other game properties. In some examples, at least some of the game property tags may be predetermined by an operator of the video game platform, a developer, or a publisher. In other examples, at least some of the game property tags may be community generated. In a specific example, a game application in which a threshold percentage of users complete 100% of the achievements or trophies (associated with a "Completionist" tag recorded to a user profile) has the "Completionist" tag added to the game property tags for the game application. This game property tag indicates that the game application is of particular interest to users that enjoy completing 100% of the achievements or trophies. In another specific example, a game application in which a threshold quantity of users complete a minimum quantity of competitive online PvP matches (associated with a "PvP" tag recorded to a user profile) has the "PvP" tag added to the game property tags for the game application. This game property tag indicates that the game application is of particular interest to users that enjoy active PvP communities. The method includes comparing one or more tags of an unplayed game to a tag list of the user profile to determine a degree of match between the one or more tags of the unplayed game and the tag list of the user profile.

In some embodiments, the game property tags are further weighted, similar to the weightings. For example, a game application of the fighting game genre is predominantly focused on or dependent on competitive multiplayer. This is in contrast to a game application of the action/adventure genre that is predominantly played in a single player campaign but offers competitive PvP play. While both game applications could have a "PvP" game property tag associated therewith, the game application of the fighting game genre may have a higher weighting to the "PvP" tag than the game application of the action/adventure game genre to more accurately reflect the relative portion of the user's experience that is focused on PvP in each game application.

In some embodiments, the method further includes ranking at least a portion of the plurality of unplayed games based at least partially on the tag list. In some embodiments, ranking at least a portion of the plurality of unplayed games includes calculating a percentage match of the tag list to the game property tags of the individual unplayed games of the plurality of unplayed games. For example, a tag list of a user profile that includes all of the game properties tags of the unplayed game application may be a 100% match. In another example, a tag list of a user profile that includes all of the game properties tags of the unplayed game application and no tags that are not present in the game properties tags may be a 100% match. In yet another example, a tag list of a user profile that includes all of the game properties tags of the unplayed game application with equal weighting of each tag may be a 100% match. In such an example, a tag list of a user profile that includes the game properties tags of the unplayed game application with different weighting may produce less than a 100% match.

In some embodiments, ranking at least a portion of the plurality of unplayed games includes clustering unplayed games into tiers from which the user may select an unplayed game. For example, a first tier may include unplayed game applications that have a 75% or higher match between the tag list of the user profile and the game property tags of the unplayed game application, and a second tier may include unplayed game applications that have between a 50% match and a 75% match between the tag list of the user profile and the game property tags of the unplayed game application. The first tier indicates a high degree of commonality between the tag list of the user profile and the game property tags of the game application, while the second tier indicates a lower degree of commonality between the tag list of the user profile and the game property tags of the game application.

In another example, a first tier may include unplayed game applications that have a 75% or higher match between the tag list of the user profile and the game property tags of the unplayed game application, and a second tier may include unplayed game applications that have a 75% of higher match between the tag list of the user profile and the game property tags of the unplayed game application, but at least one tag or category of tags is mismatched between the tag list and the game properties. For example, a user profile may have a tag list including "PvP", "Fast-paced", "Fantasy", "Teammate", and "Melee", whereas the game property tags include "PvP", "Fast-paced", "Sci-Fi", "Teammate", and "Melee". The first tier indicates a high degree of commonality between the tag list of the user profile and the game property tags of the game application, while the second tier indicates a high degree of commonality between the tag list of the user profile and the game property tags of the game application while offering the user a different type of game to try.

A user may not always want his or her next gameplay experience to be exactly the same as previous gameplay experiences, and different tiers can allow users to quickly visualize options. The method includes presenting to the user a recommended game based at least partially on a ranked plurality of unplayed games. In some embodiments, presenting a recommended game includes presenting a graphical user interface (GUI) to the user including a representation of an unplayed game application. In some examples, the GUI includes a ranking indicator. The ranking indicator may communicate to the user the percentage match between a tag list of the user profile and the game property tags of the unplayed game application. The ranking indicator may communicate a tier of match, such as "A", "B", "C", etc. The ranking indicator may include a description of the relationship between the tag list of the user profile and the game property tags of the unplayed game application, such as "close match to your preferences" or "similar to your preferences, but Sci-Fi."

In some embodiments, presenting to the user a recommended game based at least partially on a ranked plurality of unplayed games includes providing a link to a cloud-based copy of the game application to allow the user to quickly try or experience the game without needing to wait for a download of the game application to the client device. In some embodiments, presenting to the user a recommended game based at least partially on a ranked plurality of unplayed games includes downloading at least a portion of the recommended game to the client device automatically to allow the user to quickly try or experience the game without needing to initialize the download and wait for the download of the game application to the client device. In some examples, a game application can execute a portion of the game, such as a tutorial, without a complete download of the game application. The method may include downloading a portion of the game application needed to allow the user to experience the game application automatically. In some embodiments, presenting to the user a recommended game based at least partially on a ranked plurality of unplayed games includes downloading at least a portion of the highest ranked match between the tag list and the game property tags of the plurality of game applications.

In some embodiments, a client device displays to a user a GUI based on a recommended game template with a plurality of fields. The client device receives populating information from the recommendation engine to display recommended game applications to the user. For example, the recommended game template may include a highest rank recommended game application within the ranked plurality of unplayed games. In other examples, the recommended game template may include a plurality of the highest ranked recommended game application. In yet other examples, the recommended game template may further include highest rank recommended game application and at least one unplayed game application above a minimum recommendation threshold percentage match but having at least one game property tag not shared with the tag list of the user profile. For example, the recommended game template may include the highest ranked match in a plurality of different genres based at least partially on the ranked plurality of unplayed games.

In some embodiments, the recommended game template includes a game title and game art. The recommended game template presents one or more options for launching or preparing to launch the recommended game, such as a local launch input, if the client device has downloaded the recommended game application to a local hardware storage device, a cloud launch input, if cloud-based gaming is available for the recommended game application, or a download input to initialize a download of the recommended game application to the client device.

To assist the user in choosing a recommended game application, the recommended game template includes, in some embodiments, a quantitative relationship indicator and/or a qualitative relationship indicator. The quantitative relationship indicator may communicate the quantitative relationship or match between the tag list of the user profile and the game property tags of the recommended game. For example, the quantitative relationship indicator may be a numerical representation of the percentage match between the tag list of the user profile and the game property tags of the recommended game. The qualitative relationship indicator may communicate the qualitative relationship or match between the tag list of the user profile and the game property tags of the recommended game. For example, the qualitative relationship indicator may describe to the user how the recommended game matches, or does not match, the tag list of the user profile. In at least one example, the qualitative relationship indicator may indicate that the recommended game is "The highest match to the tag list of the user profile within the sports game genre" or similar qualitative description.

In some embodiments, the recommendation engine (whether executed on the client device, a server computer, or other computing device in data communication with the client device and/or server computer) may continuously or periodically update the tag list of the user profile and the ranked plurality of unplayed games. A method of recommending an unplayed game to a user includes, in some embodiments, includes identifying events in video information from a game application, using the identified events to populate a tag list of a user profile, and using the tag list to ranked unplayed games for presentation to the user.

In some embodiments, the method can use any source of video information from a game application, such as gameplay recordings, recreated renderings of a gameplay session based on game state data, or from live streams of the gameplay. For example, obtaining the video information may include obtaining the video information in real-time as the video information is generated by the processor(s) of the client device (e.g., during live streaming of gameplay). In some examples, obtaining the video information includes accessing a recording of the gameplay that was generated by the processor(s) of the client device after the fact, such as from archived gameplay recordings and/or game state data posted on a social media platform.

The method includes evaluating at least one frame of the plurality of frames of the video information at to identify a virtual object, texture, model, or animation. After identifying the virtual object, texture, model, or animation in the frame, the method includes determining a presence of at least one event associated with the detected element.

In some embodiments, the determining the presence of at least one event in the video information includes comparing the detected object, texture, model, or animation to one or more events of an application module. As described herein, the application module may be predetermined or may be generated by a ML, system. In some embodiments, the application module includes key events, popular events, rare events, any other types of events, or combinations thereof.

While some embodiments of systems and methods for identifying and/or tagging events a user evaluate only video information, some embodiments evaluate other forms of information or data to supplement the video information. In some embodiments, the gameplay obtained further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment.

In some embodiments, the video information includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

In some embodiments, the at least one event is a completion of an achievement or trophy. For example, the completion of an achievement or trophy may be communicated to a server computer via a network communication and/or recorded as shell-level or OS-level of the client device. The recommendation engine may detect the completion of an achievement or trophy as at least one event in the user gameplay.

The video information and/or events identified may be associated with a tag or a category of tags in the application module and/or in the recommendation engine. The method further includes querying a table of tags and identifying a tag associated with the identified event. For example, in a first game application, an identified event in related to healing a co-operative teammate in an MMORPG may be associated with a "co-operative" tag or "team player" tag. In another game application, providing an assist to a teammate in a sports game application may be associated with the same tags, despite the actual event being different. The aggregation of multiple iterations of a tag within a user profile can increase the influence that tag has on the user profile.

The method includes recording the identified tag to a user profile. In some examples, the tag is recorded in the user profile independent of the game application being played. In some examples, a plurality of tags are recorded for a single identified event. The aggregation of multiple iterations of a tag within a user profile can increase the influence that tag has on the user profile.

In some embodiments, the method further includes accessing an unplayed game list. In some embodiments, accessing the unplayed game list includes comparing a game history of a user profile to an available game list. For example, the user profile may be associated with a video game platform, such as a video game distribution platform, a video game multiplayer platform, a video game social platform, or another online video game platform that allows users to communicate with the video game platform to access available game applications or portions of game applications. In a specific example, a video game distribution platform includes a library of game applications that are available for download to a client device, and the downloaded game application is executable on the client device. In another example, a video game distribution platform is a cloud-based video game platform that allows a client device to access and interact with game applications stored and executed on a remote server. In some embodiments, the unplayed game list includes game applications available for download to a client device and/or available for cloud-based access and interaction.

The unplayed game list includes at least one game application that is present in the available game list and not present in the game history of the user profile. In some embodiments, the unplayed game list includes at least one game application present in the game history that the user profile has not accessed or played within a predetermined time period. In one example, the unplayed game list may include any game application in the available game list that is not in the game history or that the user profile has not accessed or played within 3 years. In such examples, the method allows for the recommendation of playing an older game that user may enjoy playing again, despite having played it previously. In some embodiments, the unplayed game list includes at least one game application present in the game history that the user profile has played for a total time less than a predetermine time duration. For example, the unplayed game list may include any game application in the available game list that is not in the game history or that the user profile has not accessed or played for more than 30 minutes. In such examples, the method allows for the recommendation of playing a game application that matches the user profile that user may enjoy with sufficient playtime, despite the game application being present, in a minimal sense, in the game history.

The method further includes comparing one or more game property tags of a plurality of unplayed games to the tag list of a user profile. The unplayed game list includes a plurality of unplayed games. In some embodiments, at least some of the unplayed games of the plurality of unplayed games have game property tags associated therewith that describe or reflect the gameplay, genre, art style, game modes, theme, or other game properties. In some examples, at least some of the game property tags may be predetermined by an operator of the video game platform, a developer, or a publisher. In other examples, at least some of the game property tags may be community generated. In a specific example, a game application in which a threshold percentage of users complete 100% of the achievements or trophies (associated with a "Completionist" tag recorded to a user profile) has the "Completionist" tag added to the game property tags for the game application. This game property tag indicates that the game application is of particular interest to users that enjoy completing 100% of the achievements or trophies. In another specific example, a game application in which a threshold quantity of users complete a minimum quantity of competitive online PvP matches (associated with a "PvP" tag recorded to a user profile) has the "PvP" tag added to the game property tags for the game application. This game property tag indicates that the game application is of particular interest to users that enjoy active PvP communities. The method includes comparing one or more tags of an unplayed game to a tag list of the user profile to determine a degree of match between the one or more tags of the unplayed game and the tag list of the user profile.

In some embodiments, the game property tags are further weighted. For example, a game application of the fighting game genre is predominantly focused on or dependent on competitive multiplayer. This is in contrast to a game application of the action/adventure genre that is predominantly played in a single player campaign but offers competitive PvP play. While both game applications could have a "PvP" game property tag associated therewith, the game application of the fighting game genre may have a higher weighting to the "PvP" tag than the game application of the action/adventure game genre to more accurately reflect the relative portion of the user's experience that is focused on PvP in each game application.

In some embodiments, the method further includes ranking at least a portion of the plurality of unplayed games based at least partially on the tag list. In some embodiments, ranking at least a portion of the plurality of unplayed games includes calculating a percentage match of the tag list to the game property tags of the individual unplayed games of the plurality of unplayed games. For example, a tag list of a user profile that includes all of the game properties tags of the unplayed game application may be a 100% match. In another example, a tag list of a user profile that includes all of the game properties tags of the unplayed game application and no tags that are not present in the game properties tags may be a 100% match. In yet another example, a tag list of a user profile that includes all of the game properties tags of the unplayed game application with equal weighting of each tag may be a 100% match. In such an example, a tag list of a user profile that includes the game properties tags of the unplayed game application with different weighting may produce less than a 100% match.

In some embodiments, ranking at least a portion of the plurality of unplayed games includes clustering unplayed games into tiers from which the user may select an unplayed game. For example, a first tier may include unplayed game applications that have a 75% or higher match between the tag list of the user profile and the game property tags of the unplayed game application, and a second tier may include unplayed game applications that have between a 50% match and a 75% match between the tag list of the user profile and the game property tags of the unplayed game application. The first tier indicates a high degree of commonality between the tag list of the user profile and the game property tags of the game application, while the second tier indicates a lower degree of commonality between the tag list of the user profile and the game property tags of the game application.

In another example, a first tier may include unplayed game applications that have a 75% or higher match between the tag list of the user profile and the game property tags of the unplayed game application, and a second tier may include unplayed game applications that have a 75% of higher match between the tag list of the user profile and the game property tags of the unplayed game application, but at least one tag or category of tags is mismatched between the tag list and the game properties. For example, a user profile may have a tag list including "PvP", "Fast-paced", "Fantasy", "Teammate", and "Melee", whereas the game property tags include "PvP", "Fast-paced", "Sci-Fi", "Teammate", and "Melee". The first tier indicates a high degree of commonality between the tag list of the user profile and the game property tags of the game application, while the second tier indicates a high degree of commonality between the tag list of the user profile and the game property tags of the game application while offering the user a different type of game to try.

A user may not always want his or her next gameplay experience to be exactly the same as previous gameplay experiences, and different tiers can allow users to quickly visualize options. The method includes presenting to the user a recommended game based at least partially on a ranked plurality of unplayed games. In some embodiments, presenting a recommended game includes presenting a graphical user interface (GUI) to the user including a representation of an unplayed game application. In some examples, the GUI includes a ranking indicator. The ranking indicator may communicate to the user the percentage match between a tag list of the user profile and the game property tags of the unplayed game application. The ranking indicator may communicate a tier of match, such as "A", "B", "C", etc. The ranking indicator may include a description of the relationship between the tag list of the user profile and the game property tags of the unplayed game application, such as "close match to your preferences" or "similar to your preferences, but Sci-Fi."

In some embodiments, presenting to the user a recommended game based at least partially on a ranked plurality of unplayed games includes providing a link to a cloud-based copy of the game application to allow the user to quickly try or experience the game without needing to wait for a download of the game application to the client device. In some embodiments, presenting to the user a recommended game based at least partially on a ranked plurality of unplayed games includes downloading at least a portion of the recommended game to the client device automatically to allow the user to quickly try or experience the game without needing to initialize the download and wait for the download of the game application to the client device. In some examples, a game application can execute a portion of the game, such as a tutorial, without a complete download of the game application. The method may include downloading a portion of the game application needed to allow the user to experience the game application automatically. In some embodiments, presenting to the user a recommended game based at least partially on a ranked plurality of unplayed games includes downloading at least a portion of the highest ranked match between the tag list and the game property tags of the plurality of game applications.

In at least some embodiments, system and methods according to the present disclosure can allow more relevant recommendations to users based on, not only the game applications the user tries or plays, but the choices, experiences, preferences, and selections made during the time the user spends interacting with game applications.

The present disclosure relates to systems and methods for recommending video games to a user according to at least the examples provided in the sections below:

[A1] In some embodiments, a method of recommending an unplayed game application to a user includes obtaining a game history associated with a user profile, wherein the game history includes at least one game record of a game application the user profile has been used to play, and evaluating the game history to obtain a plurality of game events associated with a game application of the game history. The method further includes accessing a table of tags associated with the plurality of game events associated with the game application, aggregating a plurality of tags in a tag list in the user profile based at least partially on the table of tags and the plurality of game events, and presenting to the user a recommendation of an unplayed game application based at least partially on the plurality of tags.

[A2] In some embodiments, the plurality of tags of [A1] is stored in the user profile.

[A3] In some embodiments, presenting to the user a recommendation of an unplayed game application of [A1] or [A2] includes automatically downloading at least a portion of the unplayed game application.

[A4] In some embodiments, presenting to the user a recommendation of an unplayed game application of any of [A1] through [A3] includes presenting a GUI to the user, wherein the GUI includes a cloud launch input configured to launch the unplayed game application at a server computer.

[A5] In some embodiments, evaluating the game history to obtain a plurality of game events associated with a game application of the game history of any of [A1] through [A4] includes accessing a plurality of game achievements associated with the game application and completed by the user profile.

[A6] In some embodiments, aggregating a plurality of tags of any of [A1] through [A5] further includes weighting a first tag of the tag list.

[A7] In some embodiments, weighting the first tag of [A6] includes determining a quantity of instances of the first tag.

[A8] In some embodiments, weighting the first tag of [A6] includes obtaining a total time played associated with the first tag

[A9] In some embodiments, weighting the first tag of [A6] includes obtaining an estimated time to complete an instance of the first tag.

[B1] In some embodiments, a method of recommending an unplayed game application to a user includes obtaining a game history associated with a user profile, wherein the game history includes at least one game record of a game application the user profile has been used to play, and evaluating the game history to obtain a plurality of game events associated with a game application of the game history. The method further includes accessing a table of tags associated with the plurality of game events associated with the game application and aggregating a plurality of tags in a tag list in the user profile based at least partially on the table of tags and the plurality of game events. The method further includes identifying a gameplay event during user gameplay, obtaining a new tag associated with the gameplay event, and adding the new tag to the plurality of tags in the user profile. The method includes presenting to the user a recommendation of an unplayed game application based at least partially on the plurality of tags.

[B2] In some embodiments, identifying the gameplay event of [B1] includes identifying a multiplayer network request.

[B3] In some embodiments, identifying the gameplay event of [B1] includes identifying a change in game statistics of the user gameplay in the game application.

[B4] In some embodiments, identifying the gameplay event of [B1] includes identifying a change in a user interface in video information

[B5] In some embodiments, obtaining the new tag of any of [B1] through [B4] includes inputting the gameplay event into an ML model.

[B6] In some embodiments, obtaining the new tag of any of [B1] through [B4] includes identifying a related gameplay event in the table of tags.

[B7] In some embodiments, the unplayed game application of any of [B1] through [B6] is not present in the game history.

[C1] In some embodiments, a method of recommending an unplayed game to a user includes accessing an unplayed game list, comparing one or more game property tags of a plurality of unplayed games to a tag list of a user profile, ranking at least a portion of the plurality of unplayed games based at least partially on the tag list, and presenting to the user a recommended game based at least partially on a ranked plurality of unplayed games.

[C2] In some embodiments, accessing an unplayed game list of [C1] includes comparing a game history to an available game list.

[C3] In some embodiments, comparing one or more game property tags of a plurality of unplayed games to a tag list of a user profile of [C1] or [C2] includes comparing a weighting of the one or more game property tags to a weighting of the tag list.

[C4] In some embodiments, ranking at least a portion of the plurality of unplayed games based at least partially on the tag list of any of [C1] through [C3] includes creating a plurality of tiers based on the ranked plurality of unplayed games.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of recommending an unplayed game application to a user, the method comprising:
   obtaining a game history associated with a user profile, wherein the game history includes at least one game record of a game application the user profile has been used to play;
   evaluating the game history to obtain a plurality of game events associated with a game application of the game history;
   accessing a table of tags associated with the plurality of game events associated with the game application;
   aggregating a plurality of tags in a tag list in the user profile based at least partially on the table of tags and the plurality of game events; and
   presenting to the user a recommendation of an unplayed game application based at least partially on the plurality of tags by automatically downloading at least a portion of the unplayed game application.

2. The method of claim 1, wherein the plurality of tags is stored in the user profile.

3. The method of claim 1, wherein presenting to the user a recommendation of an unplayed game application includes presenting a graphical user interface (GUI) to the user, wherein the GUI includes a cloud launch input configured to launch the unplayed game application at a server computer.

4. The method of claim 1, wherein evaluating the game history to obtain a plurality of game events associated with a game application of the game history includes accessing a plurality of game achievements associated with the game application and completed by the user profile.

5. The method of claim 1, wherein aggregating a plurality of tags further includes weighting a first tag of the tag list.

6. The method of claim 5, wherein weighting the first tag includes determining a quantity of instances of the first tag.

7. The method of claim 5, wherein weighting the first tag includes obtaining a total time played associated with the first tag.

8. The method of claim 5, wherein weighting the first tag includes obtaining an estimated time to complete an instance of the first tag.

9. A method of recommending an unplayed game application to a user, the method comprising:
   obtaining a game history associated with a user profile, wherein the game history includes at least one game record of a game application the user profile has been used to play;
   evaluating the game history to obtain a plurality of game events associated with the at least one game record of the game history;
   accessing a table of tags associated with the plurality of game events associated with the game application;
   aggregating a plurality of tags in the user profile based at least partially on the table of tags and the plurality of game events;
   identifying a gameplay event during user gameplay;
   obtaining a new tag associated with the gameplay event;
   adding the new tag to the plurality of tags in the user profile; and
   presenting to the user a recommendation of an unplayed game application based at least partially on the plurality of tags by automatically downloading at least a portion of the unplayed game application.

10. The method of claim 9, wherein identifying the gameplay event includes identifying a multiplayer network request.

11. The method of claim 9, wherein identifying the gameplay event includes identifying a change in game statistics of the user gameplay in the game application.

12. The method of claim 9, wherein identifying the gameplay event includes identifying a change in a user interface in video information.

13. The method of claim 9, wherein obtaining the new tag includes inputting the gameplay event into an ML model.

14. The method of claim 9, wherein obtaining the new tag includes identifying a related gameplay event in the table of tags.

15. The method of claim 9, wherein the unplayed game application is not present in the game history.

16. A method of recommending an unplayed game to a user, the method comprising:
   accessing an unplayed game list;
   comparing one or more game property tags of a plurality of unplayed games to a tag list of a user profile;
   ranking at least a portion of the plurality of unplayed games based at least partially on the tag list; and
   presenting to the user a recommended game based at least partially on a ranked plurality of unplayed games by automatically downloading at least a portion of the unplayed game application.

17. The method of claim 16, wherein accessing an unplayed game list includes comparing a game history to an available game list.

18. The method of claim 16, wherein comparing one or more game property tags of a plurality of unplayed games to a tag list of a user profile includes comparing a weighting of the one or more game property tags to a weighting of the tag list.

19. The method of claim 16, wherein ranking at least a portion of the plurality of unplayed games based at least partially on the tag list includes creating a plurality of tiers based on the ranked plurality of unplayed games.

20. The method of claim 9, wherein evaluating the game history to obtain a plurality of game events includes accessing a plurality of game achievements associated with the game application and completed by the user profile.

* * * * *